(12) United States Patent
Teranishi

(10) Patent No.: US 8,972,795 B2
(45) Date of Patent: *Mar. 3, 2015

(54) PROCESSOR SYSTEM OPTIMIZATION

(71) Applicant: Spansion LLC, Sunnyvale, CA (US)

(72) Inventor: Masaomi Teranishi, Kanagawa (JP)

(73) Assignee: Spansion LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/091,470

(22) Filed: Nov. 27, 2013

(65) Prior Publication Data

US 2014/0089937 A1 Mar. 27, 2014

Related U.S. Application Data

(63) Continuation of application No. 12/549,708, filed on Aug. 28, 2009, now Pat. No. 8,612,805, which is a continuation of application No. PCT/JP2007/000274, filed on Mar. 20, 2007.

(51) Int. Cl.
*G06F 11/00* (2006.01)
*G06F 9/48* (2006.01)
*G06F 11/34* (2006.01)

(52) U.S. Cl.
CPC .......... *G06F 9/4881* (2013.01); *G06F 11/3423* (2013.01); *G06F 11/3466* (2013.01); *G06F 11/3452* (2013.01); *G06F 2201/88* (2013.01)
USPC ................................. 714/45; 714/37; 714/25

(58) Field of Classification Search
CPC ............ G06F 11/3419; G06F 11/3452; G06F 2201/88
USPC ....................................... 714/45, 37
See application file for complete search history.

(56) References Cited

U.S. PATENT DOCUMENTS 6,266,805 B1 * 7/2001 Nwana et al. ................. 717/104
7,003,769 B1    2/2006 Yoshimura et al.
7,373,557 B1 * 5/2008 Wise et al. .................... 714/47.1
(Continued)

FOREIGN PATENT DOCUMENTS

JP  4-367035 A  12/1992
JP  5-88912 A    4/1993
(Continued)

OTHER PUBLICATIONS

Office Action mailed Apr. 30, 2013 in corresponding Japanese Patent Application No. 2009-504916.
Shinichi Iiyama et al., "A Schedulability Analyzing Method for Engine Management System", Information Processing Society of Japan, vol. 43, No. 6, Jun. 2002, pp. 1715-1724.
Japanese Office Action issued Sep. 25, 2012 in corresponding Japanese Patent Application No. 2009-504916.
(Continued)

*Primary Examiner* — Sarai Butler
(74) *Attorney, Agent, or Firm* — Sterne, Kessler, Goldstein & Fox PLLC

(57) ABSTRACT

In order to enable the optimization of a processor system without relying upon knowhow or manual labor, an apparatus includes: information obtainment unit for reading, from memory, trace information of the processor system and performance information corresponding to the trace information; information analysis unit for analyzing the trace information and the performance information so as to obtain a performance factor such as an idle time, a processing completion time of a task, or the number of interprocessor communications as a result of the analysis; and optimization method output unit for displaying and outputting a method of optimizing the system in response to a result of the analysis.

20 Claims, 40 Drawing Sheets

(56) References Cited

U.S. PATENT DOCUMENTS

| | | | |
|---|---|---|---|
| 8,028,200 B2* | 9/2011 | Ivanov et al. | 714/45 |
| 2002/0122517 A1* | 9/2002 | Kim | 375/368 |
| 2006/0190596 A1 | 8/2006 | Horikawa | |
| 2006/0259831 A1* | 11/2006 | Sohm et al. | 714/45 |
| 2007/0220361 A1* | 9/2007 | Barnum et al. | 714/45 |
| 2008/0155351 A1* | 6/2008 | Flake | 714/45 |
| 2008/0155353 A1* | 6/2008 | Craske | 714/45 |

FOREIGN PATENT DOCUMENTS

| | | |
|---|---|---|
| JP | 6-59944 A | 3/1994 |
| JP | 6-83608 A | 3/1994 |
| JP | 7-287693 A | 10/1995 |
| JP | 9-179754 A | 7/1997 |
| JP | 10-240578 A | 9/1998 |
| JP | 11-232148 A | 8/1999 |
| JP | 2000-242522 A | 9/2000 |
| JP | 2001-75832 A | 3/2001 |
| JP | 2001-195279 A | 7/2001 |
| JP | 2002-132543 A | 5/2002 |
| JP | 2002-342182 A | 11/2002 |
| JP | 2002-351695 A | 12/2002 |
| JP | 2003-345868 A | 12/2003 |
| JP | 2004-54396 A | 2/2004 |
| JP | 2005-339437 A | 12/2005 |
| JP | 2006-227999 A | 8/2006 |

OTHER PUBLICATIONS

Japanese Office Action mailed Apr. 17, 2012 issued in corresponding Japanese Patent Application No. 2009-504916.

Atsuhiro Suga, "The Nuts and Bolts of Tuning for Multicore Performance: Supercomputer Technology is Applied to CE Processors", Nikkei Electronics, No. 908, Sep. 2005, pp. 119-130.

E. Nunohiro et al., "Techniques and Software for Realizing High Performance", Hitachi Journal, vol. 75, No. 5, 1993, pp. 21-26.

T. Toya et al., "Protein Sequence Analysis by Parallel 3-Dimensional Dynamic Programming", Institute for New Generation Computer Technology (ICOT), vol. 91, No. 99, 1991, pp. 127-134.

A. Endo et al., "Program Development Support Features in SX-6", NEC Technical Journal, vol. 55, No. 9, 2002, pp. 66-69.

M. Kitsuregawa et al., "Performance Evaluation Tool for Super Database Computer (SDC) and Its Evaluation", Transactions of Information Processing Society of Japan, vol. 34, No. 4, Apr. 1993, pp. 793-803.

H. Imai et al., "Analysis of Responsive Systems at Processor Faults", Transactions of the Institute of Electronics, Information and Communication Engineers, vol. J78-D-I, No. 8, 1995, pp. 716-723.

Office Action mailed Jun. 21, 2012, in U.S. Appl. No. 12/549,708.

Final Office Action mailed May 17, 2013 in U.S. Appl. No. 12/549,708.

Notice of Allowance mailed Aug. 14, 2013 in U.S. Appl. No. 12/549,708.

* cited by examiner

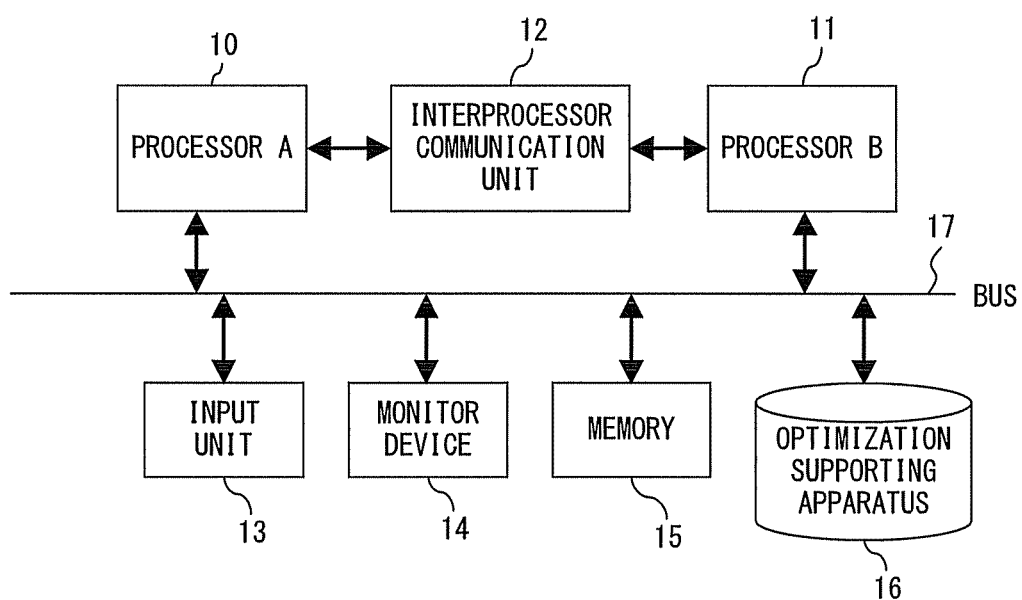
F I G. 3

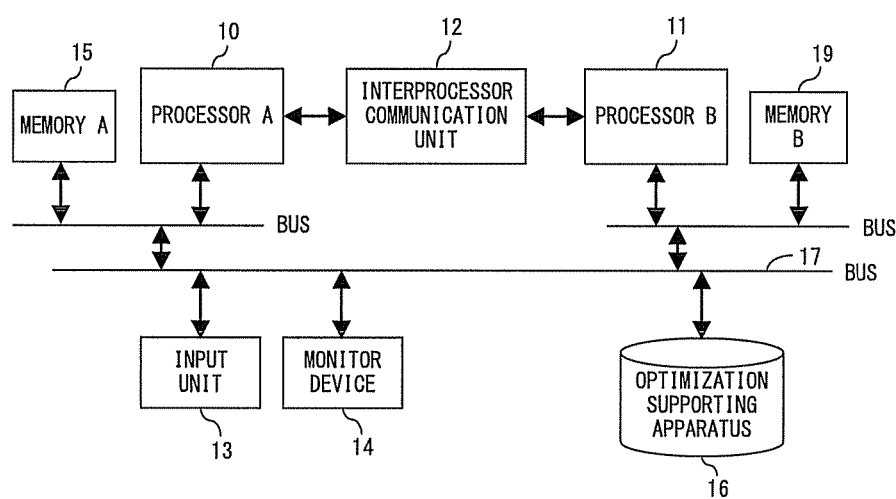
F I G. 4

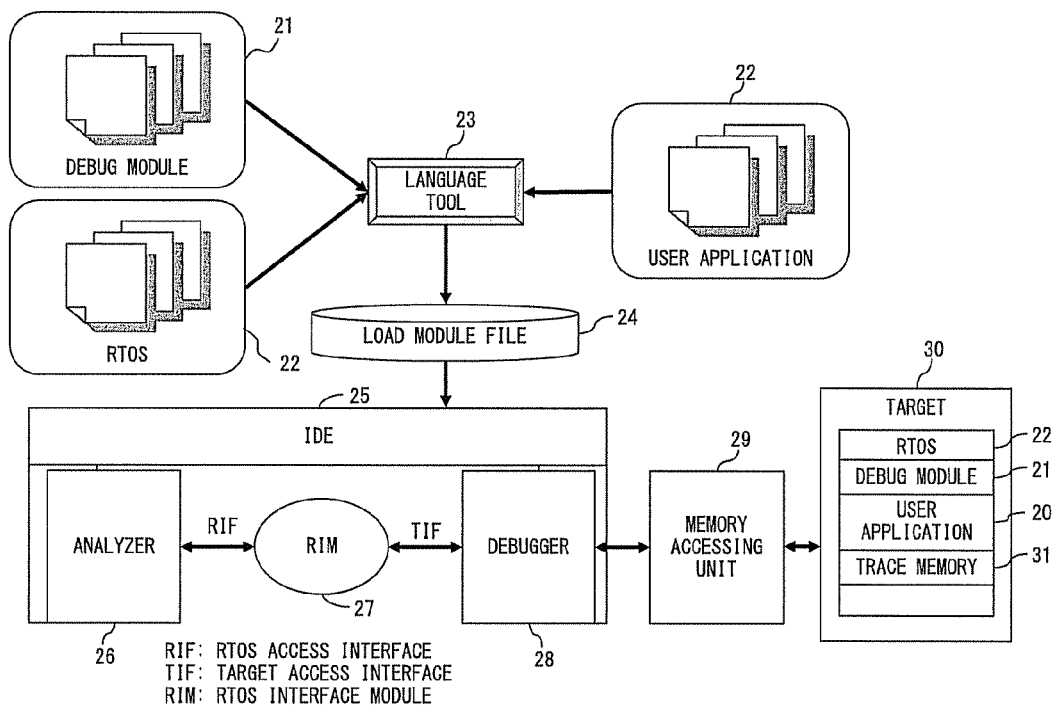
F I G. 5

| LOG TYPE | ID FOR TYPES | TYPE-EVENT | ID NUMBER | SC ADDRESS | PARAMETER 0 | PARAMETER 1 | PARAMETER 2 | RETURN VALUE | LOWER TIME | UPPER TIME | RESERVE |
|---|---|---|---|---|---|---|---|---|---|---|---|
| Dispatch | | LOG_LEAVE | TASK ID | | PA_STA | 0 | | | LOWER TIME | UPPER TIME | |
| | | | | | | | | | | | |
| Dispatch | | LOG_ENTER | TASK ID | | PA_END | PA VALUE UPON TERMINATION | | | LOWER TIME | UPPER TIME | |

FIG. 7

| TASK ID | 0 (SYSTEM) | 1 | 2 | 3 | 4 | 5 |
|---|---|---|---|---|---|---|
| EXECUTION TIME | 120 | 8990 | 500 | 300 | 80 | 0 |
| NUMBER OF INTERPROCESSER COMMUNICATIONS | | 10 | 0 | 1 | 0 | 0 |
| NUMBER OF INTERPROCESSER COMMUNICATIONS (INTEGRATED) | | 200 | 0 | 200 | 0 | 0 |

F I G. 8

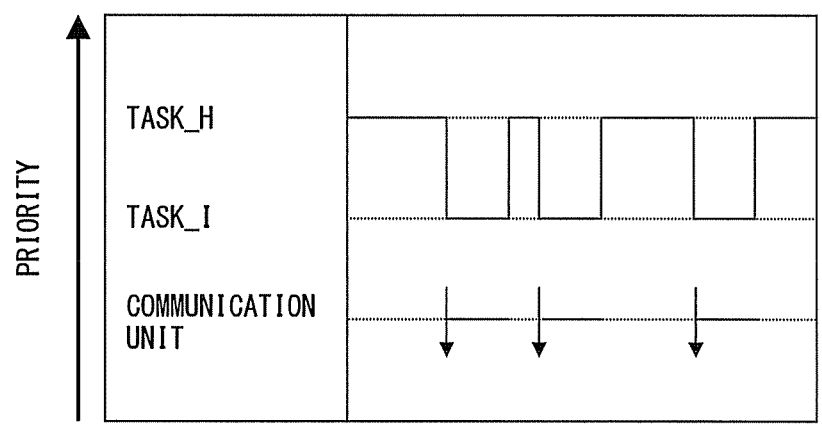
F I G. 1 2

| TASK ID | 0 (SYSTEM) | 1 | 2 | 3 | 4 | 5 |
|---|---|---|---|---|---|---|
| EXECUTION TIME OF IDLE ROUTINE | 200 | | | | | |
| EXECUTION TIME | 120 | 8990 | 500 | 300 | 80 | 0 |
| MAXIMUM READY STATE TIME | | 0 | 10 | 0 | 0 | 10000 |
| MAXIMUM PROCESSING COMPLETION TIME | | 900 | 500 | 300 | 40 | 10000 |
| NUMBER OF INTERPROCESSOR COMMUNICATIONS | | 10 | 0 | 1 | 0 | 0 |
| WAITING TIME FOR INTERPROCESSOR COMMUNICATIONS | | 10 | 0 | 100 | 0 | 0 |
| NUMBER OF TIMES DISPATCHING OCCURS | | 10 | 1 | 1 | 2 | 0 |
| NUMBER OF INTERRUPTIONS | | 9000 | 510 | 301 | 80 | 0 |
| READY STATE TIME (INTEGRATED) | | 0 | 10 | 0 | 0 | 10000 |
| WAITING STATE TIME (INTEGRATED) | | 10 | 8990 | 9490 | 9500 | 0 |
| SUSPEND TIME (INTEGRATED) | | 0 | 0 | 0 | 0 | 0 |
| WAITING-SUSPENDED TIME (INTEGRATED) | | 0 | 0 | 0 | 0 | 0 |
| TIME IN WHICH NO TASK HAS BEEN GENERATED | | 0 | 0 | 0 | 70 | 0 |
| INTERPROCESSOR COMMUNICATION TIME (INTEGRATED) | | 200 | 0 | 200 | 0 | 0 |

FIG. 16

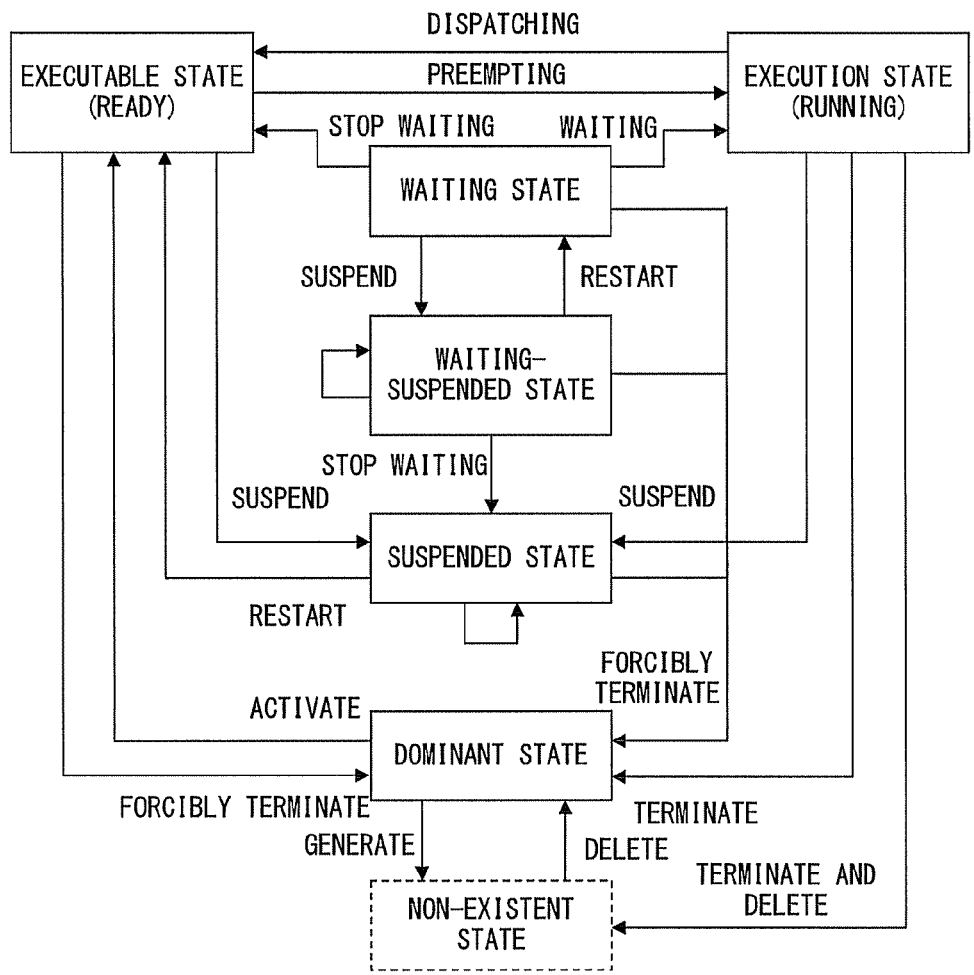
F I G. 17

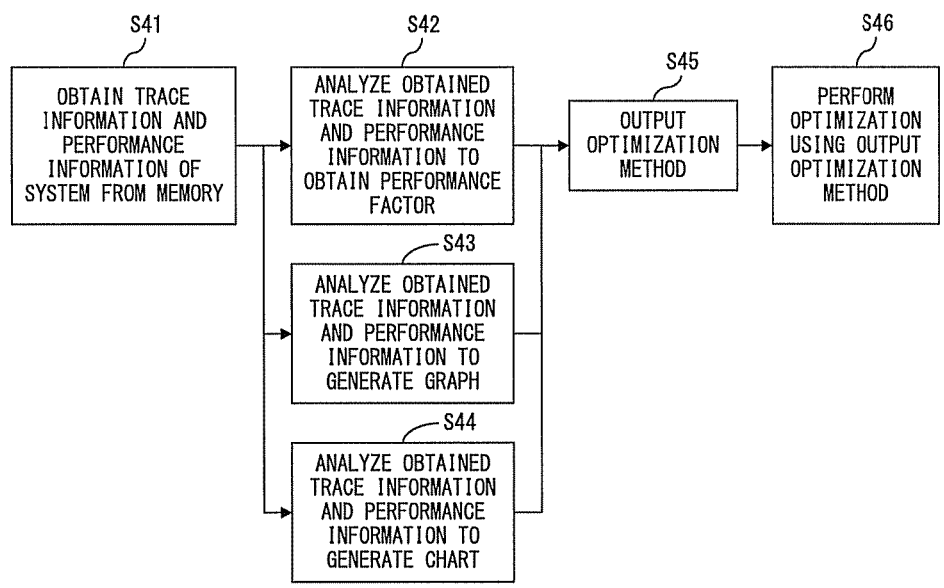
F I G. 1 8

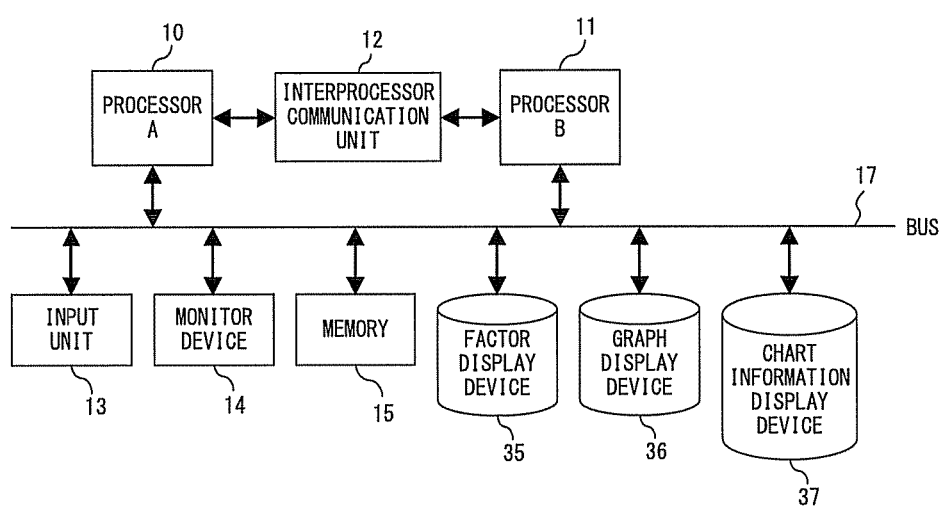
F I G. 1 9

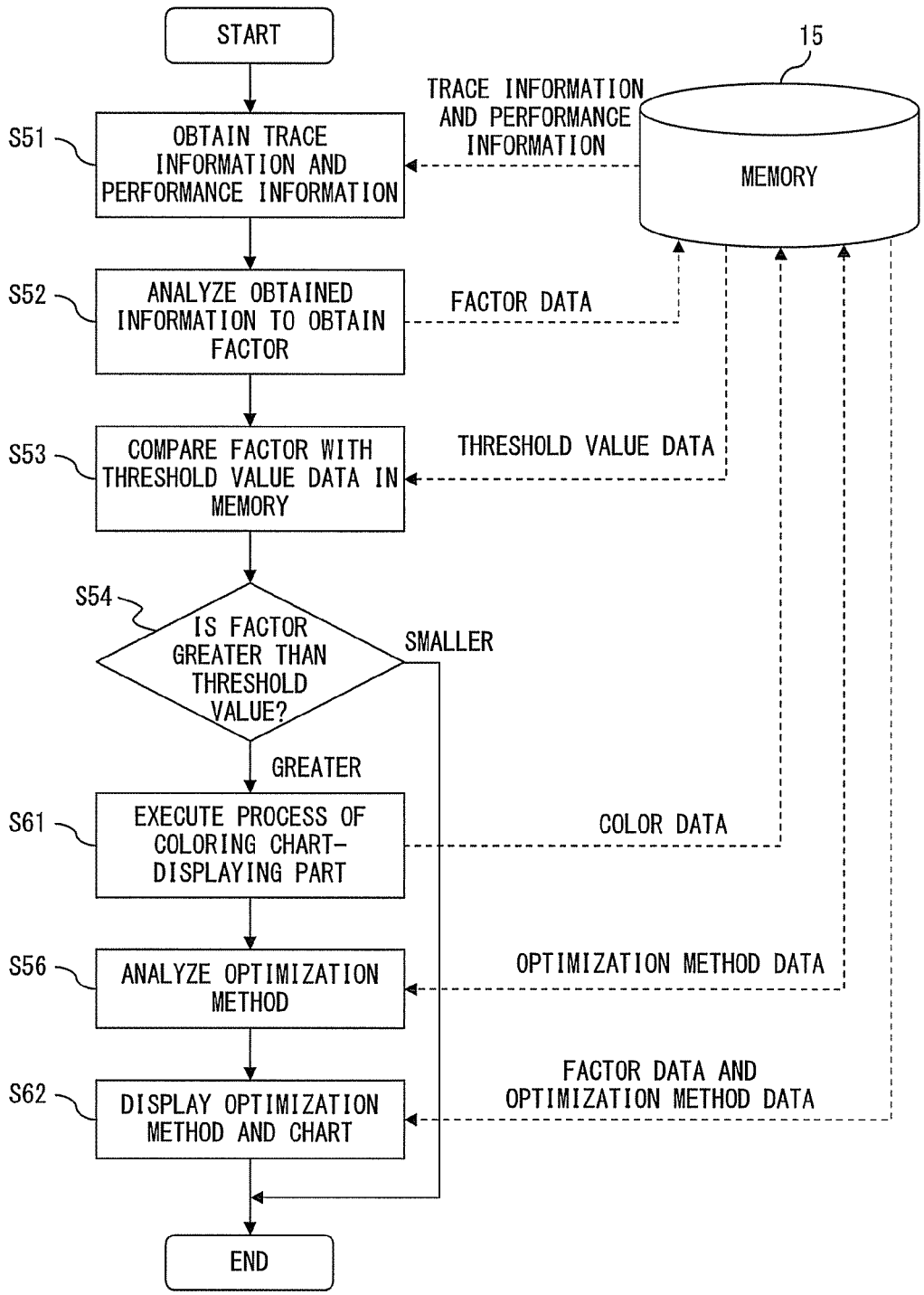
F I G. 2 6

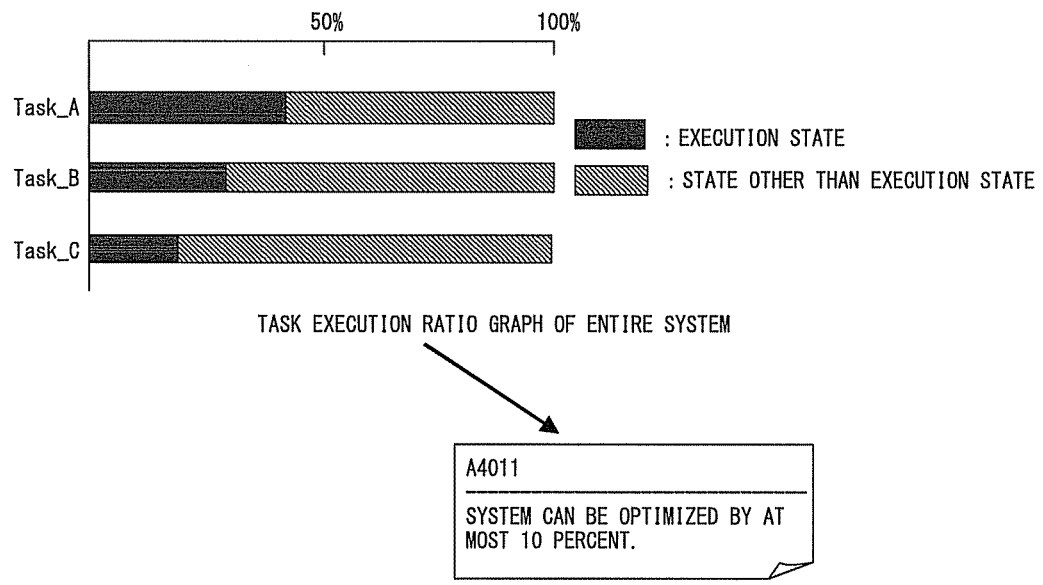
F I G. 2 8

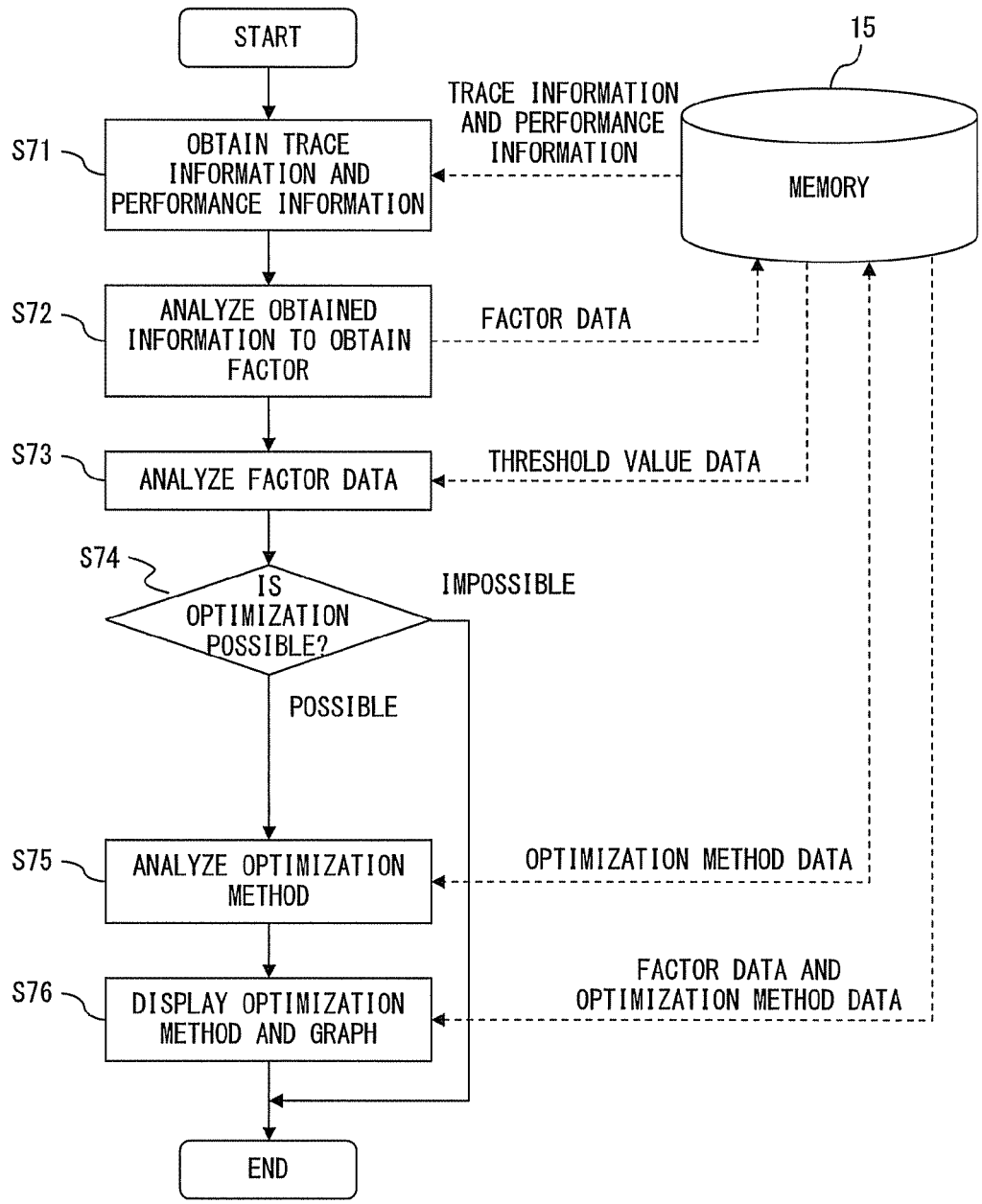
F I G. 3 1

| TASK ID | ENTIRE SYSTEM | 1 | 2 | 3 |
|---|---|---|---|---|
| PRIORITY | | 1 | 1 | 3 |
| EXECUTION TIME | 10000 | 3998 | 2805 | 2111 |
| TASK EXECUTION RATIO (SYSTEM) | | 0.3998 | 0.2805 | 0.2111 |
| TASK EXECUTION RATIO (TASK) | | 1 | 0.6 | 0.5 |
| LOAD RATIO OF PRIORITY [1] | | 1.17 | 0.82 | |
| LOAD RATIO OF PRIORITY [2] | | | | |
| LOAD RATIO OF PRIORITY [3] | | | | 1 |
| LOAD RATIO OF PRIORITY [4] | | | | |
| LOAD RATIO OF PRIORITY [5] | | | | |

FIG. 32

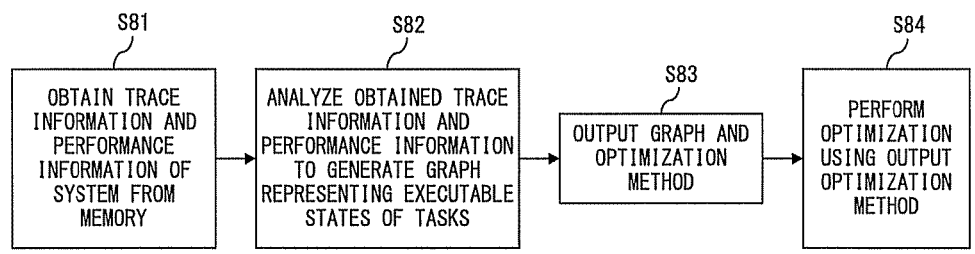
F I G. 3 3

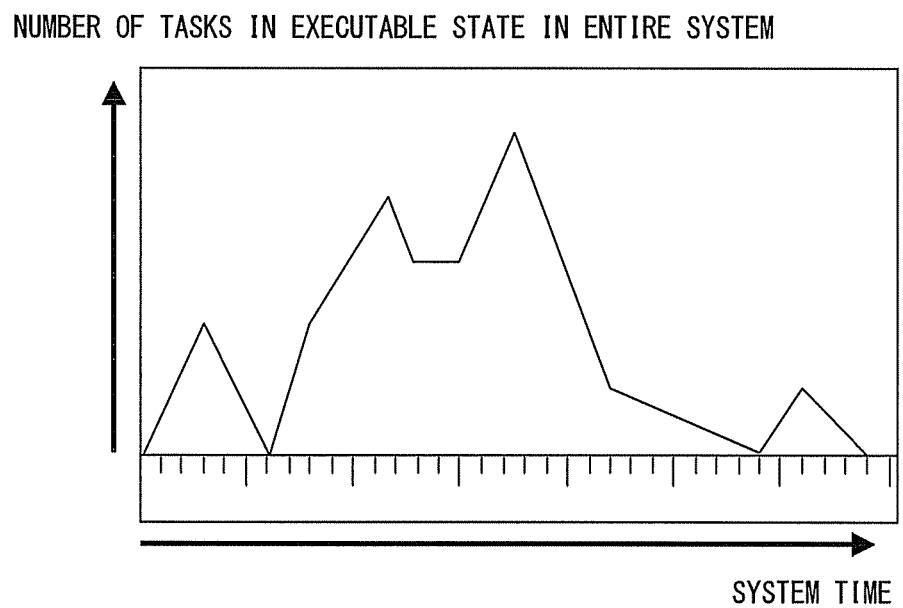
F I G. 3 4

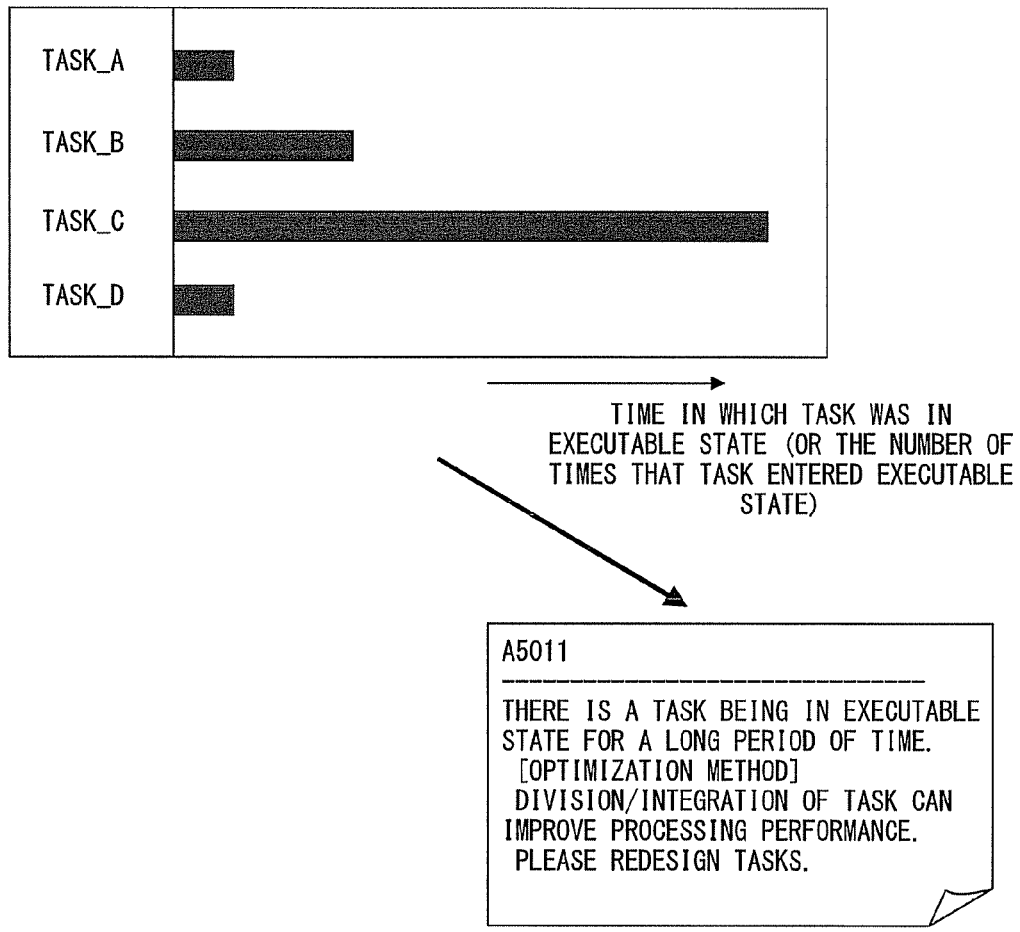
F I G. 3 5

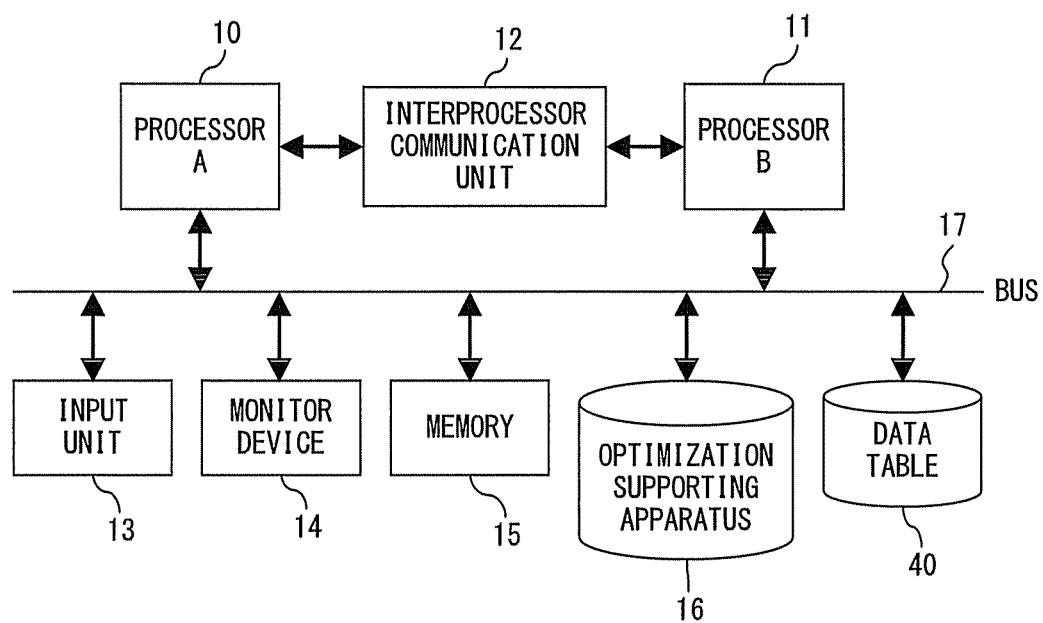
F I G. 3 7

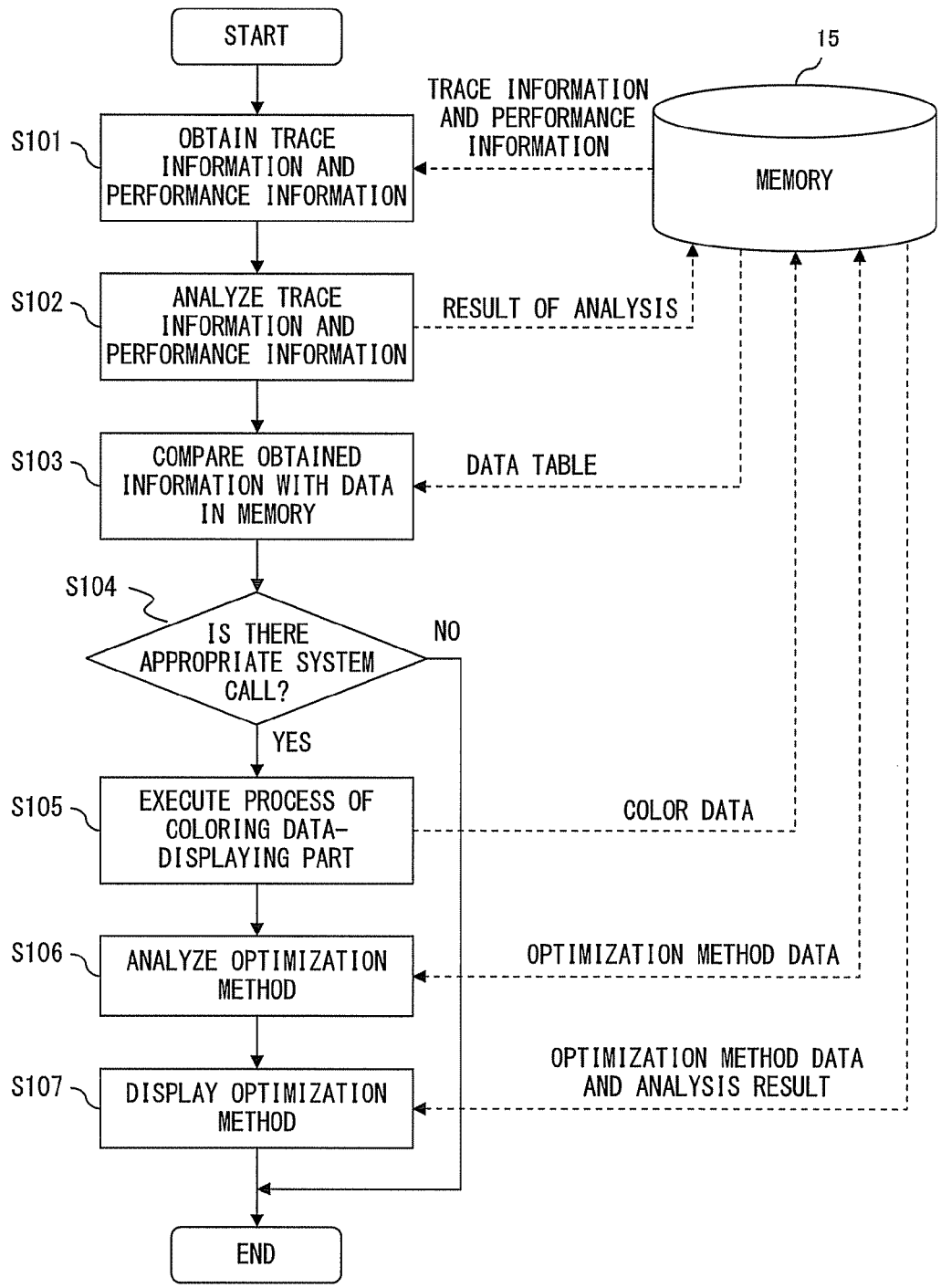
F I G. 4 0

PROCESSOR SYSTEM OPTIMIZATION

CROSS-REFERENCE TO RELATED APPLICATION

This application is a continuation of U.S. patent application Ser. No. 12/549,708, filed on Aug. 28, 2009, now U.S. Pat. No. 8,612,805, which is a continuation application of international PCT application No. PCT/JP2007/000274, filed on Mar. 20, 2007, which are both incorporated herein by reference in their entireties.

FIELD

The embodiments discussed herein are related to a system optimization supporting apparatus and a supporting method that support the optimization of a system performed by the designer of the system, by analyzing trance information indicating execution states of tasks and performance information of the system, and outputting a method of optimizing the system on the basis of a result of the analysis corresponding to software applications operating on, for example, a multitasking operating system (OS).

BACKGROUND

The optimization of software applications operating on a multitasking operating system (OS) or on an embedded system utilizing a multitasking OS has required the evaluation of the performance of the system on the basis of a plurality of pieces of data using an evaluation tool such as task transition diagrams, and the use of the knowhow of the system designer or the like. Consequently, there has been a problem wherein when a system is to be optimized taking into consideration, for example, idle time in which no task is in an execution state, the execution times of tasks, and the like, the optimization operation has to be performed manually by the system designer using the knowhow of the designer.

As a conventional technique relating to the improvement of the performance of multitasking systems, Japanese Laid-open Patent Publication No. 4-367035, "REAL TIME PROCESSOR FOR PLURAL TASKS" discloses a real-time processing apparatus that rearranges the priority of particular tasks when predetermined conditions are met, and optimizes the conditions for the rearrangement of priority in response to the usage environment by using a learning function.

Japanese Laid-open Patent Publication No. 7-287693, "DATA PROCESSOR" discloses a data processing apparatus such as a POS server that permits real-time confirmation of the operating ratios of many data processing units such as those in multitasking configurations.

Japanese Laid-open Patent Publication No. 9-179754, "TASK MONITORING DEVICE AND ITS METHOD" discloses a task monitoring apparatus and a task monitoring method for enabling tasks to recognize their own stop time so that the stop state of the tasks can be understood visually and an automatic recovering process will be executed in response to a delay in executing a task.

Japanese Laid-open Patent Publication No. 10-240578, "MULTI-TASK PROCESSOR, MULTI-TASK PROCESSING METHOD, AND MULTI-TASK PROCESSING DISPLAY METHOD" discloses a technique by which users can understand the operations of multitasking/object-oriented programs so that the operation efficiency of debugging and testing by the users can be improved.

Japanese Laid-open Patent Publication No. 2003-345868, "APPARATUS, METHOD AND PROGRAM FOR RESOURCE MANAGEMENT" discloses a technique of allowing the displaying of not only the time required by tasks but also the processing status of resources including the efficiency of the resource use, the ability of processing such as the work rate, and the loads on resources.

Japanese Laid-open Patent Publication No. 2004-54396, "RESOURCE MANAGEMENT APPARATUS, RESOURCE MANAGEMENT METHOD, RESOURCE MANAGEMENT PROGRAM, AND RECORDING MEDIUM" discloses a technique of displaying the time required by tasks, the efficiency of the resource use, the work rate, and the processing state of the resources, and of performing uniform management of the processing amount of a plurality of tasks, the processing rate, etc.

Even if the conventional techniques disclosed in the above documents are used, the problem cannot be solved that the operation of optimizing an embedded system utilizing, for example, a multitasking OS requires knowhow or manual labor. Even when optimization at a micro level such as the level of functions in tasks or at a loop level is performed, the problem cannot be solved that the optimization of the entire system requires knowhow and manual labor.

SUMMARY

In view of the above problems, it is an object of the present invention to provide an optimization supporting apparatus and a supporting method that analyze trace information and performance information of an embedded system utilizing, for example, a multitasking operating system, and to display and output an optimization method for the system in response to a result of the analysis in order to enable the optimization of the processor system without depending upon the knowhow or manual labor of the designer or the system.

A processor system optimization supporting apparatus according to the present invention includes an information obtainment unit, an information analysis unit, and an optimization method output unit. The information obtainment unit is for reading, from memory, trace information of the processor system and performance information corresponding to the trace information.

The information analysis unit is for analyzing the read trace information and performance information in order to obtain, for example, a performance factor of the system as a result of the analysis. Various types of performance factors can be obtained as factors of the system, and one of the examples thereof is an idle time in which none of the tasks in a multitasking system is in an execution state during a period for obtaining the trace information when the system is a multitasking system.

The optimization method output unit is for outputting and displaying a method of optimizing the system in response to a result of the analysis by the information analysis unit. This optimization method output unit can also obtain the data of the method of optimizing the system from memory, and can display and output the method of optimizing the system while associating the method with a result of the analysis by the information analysis unit.

A processor system optimization supporting method according to the present invention executes a method corresponding to the operations of the above system optimization supporting apparatus.

According to the present invention, a method of optimizing a system is displayed and output in response to a result of analyzing trace information and performance information of a processor system so as to support the optimization of the system.

According to the present invention, a processor system optimization supporting apparatus displays and outputs a method of optimizing an embedded system for, for example, a multiprocessor or a single processor, and thereby operations ineffective for optimization can be prevented from being repeated, and the processor system can be optimized without depending upon, for example, the technical level of the designer or the system, which greatly contributes to the improvement of efficiency in designing an embedded system utilizing a multitasking operating system.

BRIEF DESCRIPTION OF DRAWINGS

FIG. 3 illustrates the first example of the configuration of a multiprocessor system according to the first embodiment;

FIG. 4 illustrates the second example of the configuration of a multiprocessor system according to the first embodiment;

FIG. 5 is a block diagram illustrating a configuration of the optimization supporting apparatus according to the first embodiment;

FIG. 7 illustrates an example of trace information;

FIG. 8 illustrates an example of performance information;

FIG. 12 explains the number of interprocessor communications;

FIG. 16 illustrates an example of performance factor data according to the first embodiment;

FIG. 17 illustrates transitions of states of tasks;

FIG. 18 is a block diagram illustrating fundamental functions of a system optimization supporting method according to the second embodiment;

FIG. 19 illustrates the first example of a multiprocessor system according to the second embodiment;

FIG. 26 is a flowchart for a process of displaying a time chart and an optimization method according to the second embodiment;

FIG. 28 illustrates the first example of a graph and an optimization method according to the third embodiment;

FIG. 31 is a flowchart for processes of displaying a graph and an optimization method according to the third embodiment;

FIG. 32 illustrates an example of performance factor data according to the third embodiment;

FIG. 33 is a block diagram illustrating fundamental functions of an optimization supporting method according to the fourth embodiment;

FIG. 34 illustrates an example of a graph according to the fourth embodiment;

FIG. 35 illustrates an example of displaying a graph and an optimization method according to the fourth embodiment;

FIG. 37 is a block diagram illustrating the first example of the system configurations according to the fifth embodiment;

FIG. 40 is a detailed flowchart for an optimization supporting process according to the fifth embodiment.

DESCRIPTION OF EMBODIMENTS

Figure 1:
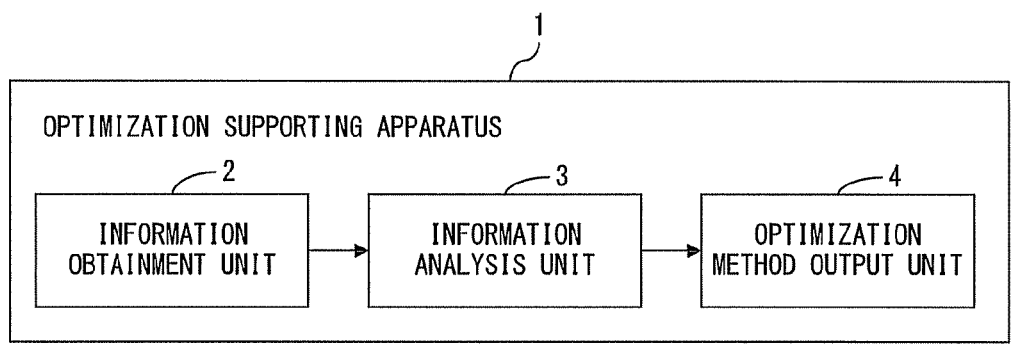
FIG. 1 is a block diagram illustrating the principle configuration of a processor system optimization supporting apparatus according to the present invention.

FIG. 1 is a block diagram illustrating the principle configuration of a processor system optimization supporting apparatus according to the present invention. In FIG. 1, an optimization supporting apparatus 1 includes an information obtainment unit 2, an information analysis unit 3, and an optimization method output unit 4. The information obtainment unit 2 reads, from memory, trace information of a processor system and the performance information corresponding to the trace information.

The information analysis unit 3 analyzes the trace information and the performance information that have been read, and obtains, for example, a performance factor of the system as a result of the analysis. Examples of the performance factor are an idle time, the maximum ready state time for each task in a multitasking system, the maximum processing completion time, the number of interprocessor communications, and the waiting time for an interprocessor communication.

The optimization method output unit 4 outputs a method of optimizing a system corresponding to a result of the analysis by the information analysis unit 3. The output result is displayed on, for example, a monitor device. In response to the displayed content, the system is optimized by, for example, the designer of the embedded system.

The optimization method output unit 4 is further capable of reading, from memory, data on a method to be used for the optimization of the system, associating the read data with the analysis result by the information analysis unit 3, and outputting that method of optimization of the system.

Figure 2:
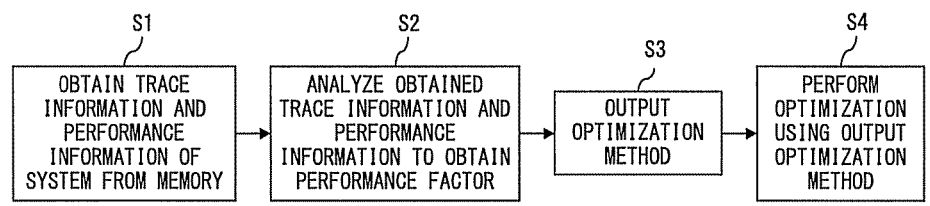
FIG. 2 is a block diagram illustrating fundamental functions of a method of optimizing a system according to the first embodiment.

Hereinafter, the first through fifth embodiments of the present invention will be explained. FIG. 2 is a block diagram illustrating fundamental functions of a method of optimizing a system according to the first embodiment. In FIG. 2, trace information and performance information of a system are obtained from memory in step S1, and a factor indicating the performance of the system is output as a result of analyzing the trace information and the performance information in step S2. Examples of this factor are factors indicating the idle time of the entire system, which is a time during which, for example, none of the tasks in a multitasking configuration are being executed and also none of the software applications are running; the number of interprocessor communications for each task; an amount of time consumed by interprocessor communications, and the like. The performance factors will be explained later in detail.

In step S3 in FIG. 2, a method of optimizing the system is output on the basis of the performance factor of the system as a result of analyzing the trace information and the performance information. In step S4, the optimization of the system is executed on the basis of the output optimization method. In the present embodiment, the optimization in step S4 is executed by the designer of the system or the like on the basis of the optimization method output in step S3 to be displayed on a monitor device and also by using the performance factor displayed on the monitor device. In addition, the information obtainment unit, the information analysis unit, and the optimization method output unit in claim 1 of the present application correspond to the processes in steps S1, S2, and S3 in FIG. 2, respectively.

FIGS. 3 and 4 are block diagrams illustrating examples of configurations of a multiprocessor system according to the first embodiment. FIG. 3 illustrates the first exemplary configuration, in which the system includes two processors A10 and B11, an interprocessor communication unit 12 for performing an interprocessor communication between the processors A10 and B11, an input unit 13, a monitor device 14, memory 15, and an optimization supporting apparatus 16 for outputting a method of optimizing the system in order to support the optimization of the system by, for example, the system designer, and a bus 17 to which all of the above components are connected.

The second example illustrated in FIG. 4 is different from the example in FIG. 3 in that the second example includes memory A15 and memory B19 respectively dedicated to the processors A10 and B11 whereas the memory 15 is used by both the processors A10 and B11 in FIG. 3.

FIG. 5 is a block diagram illustrating a configuration of the optimization supporting apparatus according to the first embodiment. In FIG. 5, a user application 20, a debug module 21, and a real-time operating system (RTOS) are supplied to a language tool 23, and a load module file 24 as a data processing program is generated. The reason for using a real-time operating system (RTOS) 22 is that the operating system in an embedded system needs to start operating in response to, for example, the pressing by the user of a button and this requires a real-time operating system.

The load module file 24 is supplied to an integrated development environment (IDE) 25 for carrying out the development. This environment includes an analyzer 26, a debugger 28, and an RTOS interface module (RIM) 27 between the analyzer 26 and the debugger 28. The analyzer 26 and the RIM 27 are connected to each other through an RTOS access interface (RIF), and the RIM 27 and the debugger 28 are connected to each other through a target access interface (TIF).

The debugger 28 can access trace memory 31 in a target 30 via a memory accessing unit 29. The target 30 is, for example, a processor, and the target 30 includes the RTOS 22, the debug module 21, and the user application 20.

Figure 6:
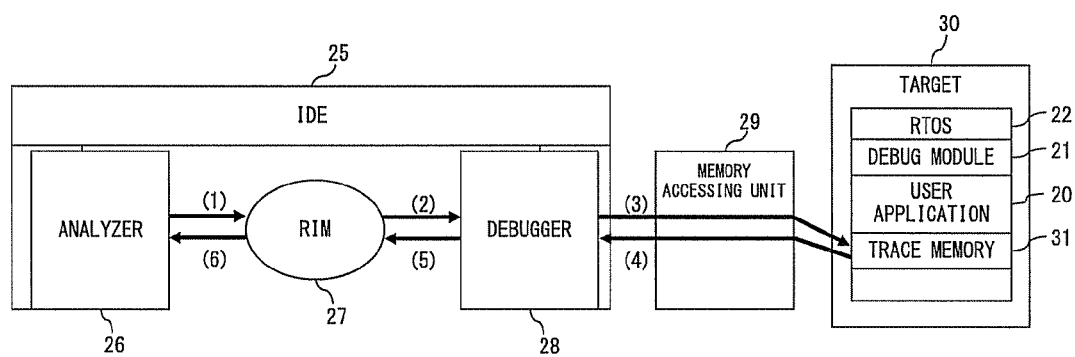
FIG. 6 explains the procedures in obtaining trace information and performance information.

FIG. 6 explains the procedures in obtaining trace information and performance information followed by the optimization supporting apparatus in FIG. 5. First, the procedure in obtaining trace information stored in the trace memory 31 is explained. When a request for obtaining data stored in the trace memory 31 is made in the analyzer 26, the analyzer 26 requests the RIM 27 to obtain a trace log in order to read the content in the trace memory 31 in the user memory area. This is indicated by arrow (1). An instruction to read the content in the trace memory 31 is issued to the debugger 28 by the RIM 27, which is indicated by arrow (2). The debugger 28 makes a data-read access to the trace memory 31 via the memory accessing unit 29, which is indicated by arrow (3).

The content read from the trace memory 31, i.e., the trace information, is transferred to the debugger 28 via the memory accessing unit 29, indicated by arrow (4), and the debugger 28 transfers the trace information to the RIM 27, indicated by arrow (5). Thereafter, the RIM 27 transfers to the analyzer 26 the data that the analyzer 26 needs, indicated by (6), and the obtainment of data in the trace memory is terminated.

Data of performance information such as a task executed by a processor, the number of communications with a different processor, the time consumed by such communications, etc. is stored in memory (not illustrated) in the target 30, i.e., the processor, and transferred to the analyzer 26 similarly to the trace information, corresponding to, for example, a counter value of a hardware counter.

FIG. 7 illustrates an example of trace information stored in the trace memory 31 in FIG. 5. In FIG. 5, the item log type represents the types of log data, and the content of the data stored in the trace memory is determined by this type. The type event "LOG_LEAVE" represents the start of a log and "LOG_ENTER" represents the termination of a log. "TASK ID" corresponding to "LOG_LEAVE" and "TASK ID" corresponding to "LOG_ENTER" may be identical, but they are essentially different. "Lower time" and "Upper time" represent the starting time and the terminating time of the task, respectively.

FIG. 8 illustrates an example of performance information. In FIG. 8, pieces of performance data such as an execution time, the number of interprocessor communications, an amount of time consumed by the interprocessor communications (integrated), etc., are stored, in memory, in units of the individual tasks, i.e., the task IDs. In this example, the execution time represented by "task ID=0" is a time during which none of the tasks with task IDs 1 through 5 are being executed in the processors for executing the tasks, and corresponds to a time for the processing by the OS such as dispatching tasks.

Figure 9:
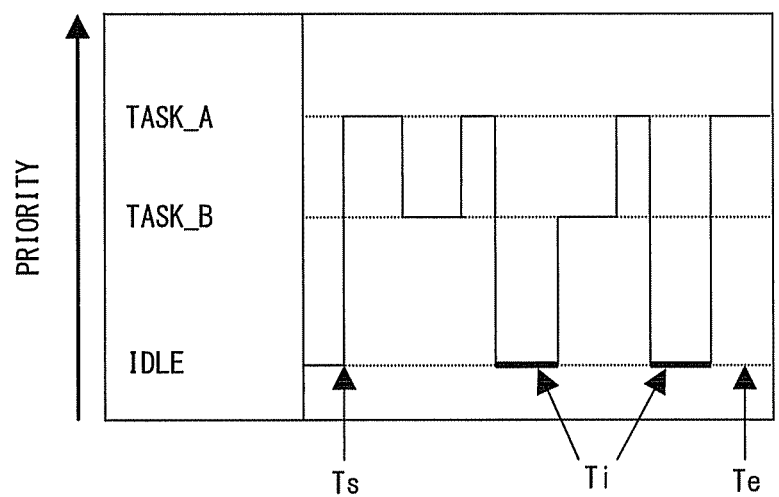
FIG. 9 illustrates an example of an idle time.

Performance factors of the system obtained by analyzing trace information and performance information will be explained by referring to FIGS. 9 through 13. In FIG. 9, when it is assumed that two tasks A and B are being executed in the system, a value obtained by integrating idle times Ti, in which none of the tasks is being executed, is obtained between trace information-obtainment-starting time point Ts and termination time point Te, and the obtained value is treated as a value of an idle time as one of the performance factors. The degree of possibility of optimization and the execution ratio of the entire system can be obtained on the basis of the ratio of this idle time to a value of (Te−Ts). Note that although task A is given higher priority than task B in this example, idle times are integrated regardless of priority.

Figure 10:
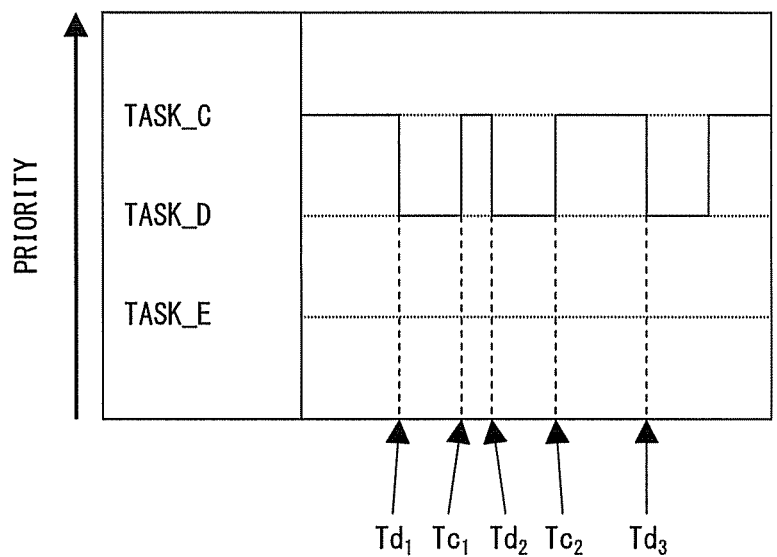
FIG. 10 illustrates a maximum ready state time.

FIG. 10 illustrates a maximum ready state time. In FIG. 10, three tasks C, D, and E are generated, and tasks C and D, which have high priority, are repeatedly dispatched so that the process is being executed. Consequently, task E, which has a low priority, continues to be without a right to be executed while it is in an executable state. Times of such executable states (ready states) are integrated in units of tasks in order to obtain the integration value of the ready state times in the survival time between the start and end of one process after each task is activated. Thereafter, the maximum value of the integration values between Ts and Te is obtained as a maximum ready state time. In this example, the maximum ready state time for task E is the difference between Te and Ts.

When, for example, one process in task C has been executed before time point Ts, and is terminated at Td2, the ready state time is the difference between Tc1 and Td1. When one process continues to reach Td3, the ready state time is a value obtained by adding the difference between Tc1 and Td1 to the difference between Tc2 and Td2. The maximum value of the integration values of the ready state times in the survival time between the activation of a process and the termination of the process between information-obtainment-starting time point Ts and the termination time point Te is obtained as the maximum ready state time for each task. On the basis of this maximum ready state time, the maximum time in which a task is in a waiting state while being executable can also be known, and whether or not the optimization is possible and the effect of the optimization can be known.

Figure 11:
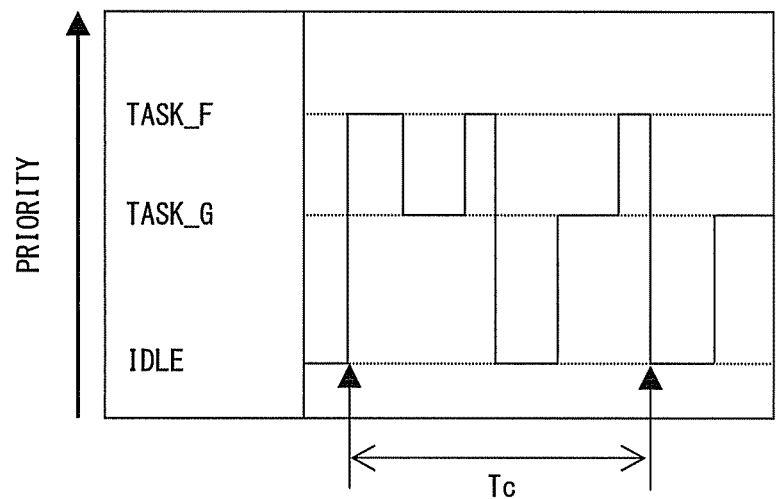
FIG. 11 explains a maximum processing termination.

FIG. 11 explains the maximum processing termination time for each task. A processing termination time is a survival time between the activation and the termination of a task, and includes a ready state time that was described above. When the activation and termination of a task are performed at least twice between time points Ts and Te, the maximum value of the processing completion time corresponding to such operations is obtained as the maximum processing completion time of that task. In FIG. 11, the maximum value between Ts and Te, during the time period between the activation and termination of one task, including idle time in which the processes for task G or the OS are being executed, is obtained as the maximum processing completion time. In this example, the maximum processing completion time is Tc. With the knowledge of the maximum processing completion time, an optimization method can be determined in association with the number of times dispatching occurs or with interruption handling.

FIG. 12 explains the number of interprocessor communications. Task H, for example, performs an interprocessor communication in order to communicate with a task being executed by a different processer between the activation of task H and the termination of one process. By counting the number of those communications, for example, between time points Ts and Te, and by dividing the resultant value by, for example, the difference between Te and Ts, the number of interprocessor communications in units of system time can be obtained as a performance factor. Because an increase in the number of interprocessor communications makes the execution time of the system longer, knowledge of the number of interprocessor communications indicates whether or not the system optimization can be performed and indicates its effect.

Figure 13:
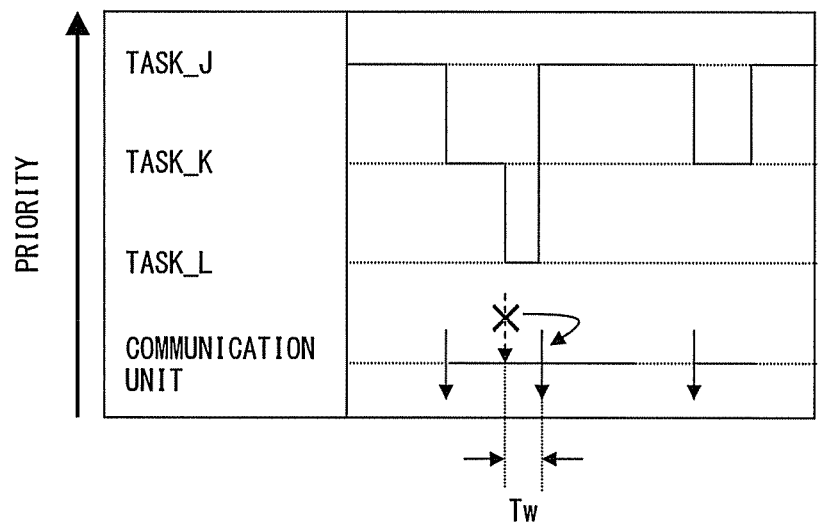
FIG. 13 explains a waiting time for an interprocessor communication.

FIG. 13 explains a waiting time for an interprocessor communication. In FIG. 13, when dispatching from task J to task K is conducted, a communication between task J and a different processor starts, and when a dispatch from task K to task L is conducted, a request for communicating with a different processor is sued by task K. However, when the interprocessor communication from task J is not terminated at this moment, that communication enters a waiting state. When the communication from task J is terminated and task J, having the highest priority, is dispatched, communication from task K to a different processer becomes possible, and the waiting time for the communication is Twin FIG. 13. How much this waiting time for the interprocessor communication can be reduced indicates whether or not an optimization is possible and indicates its effect.

Figure 14:
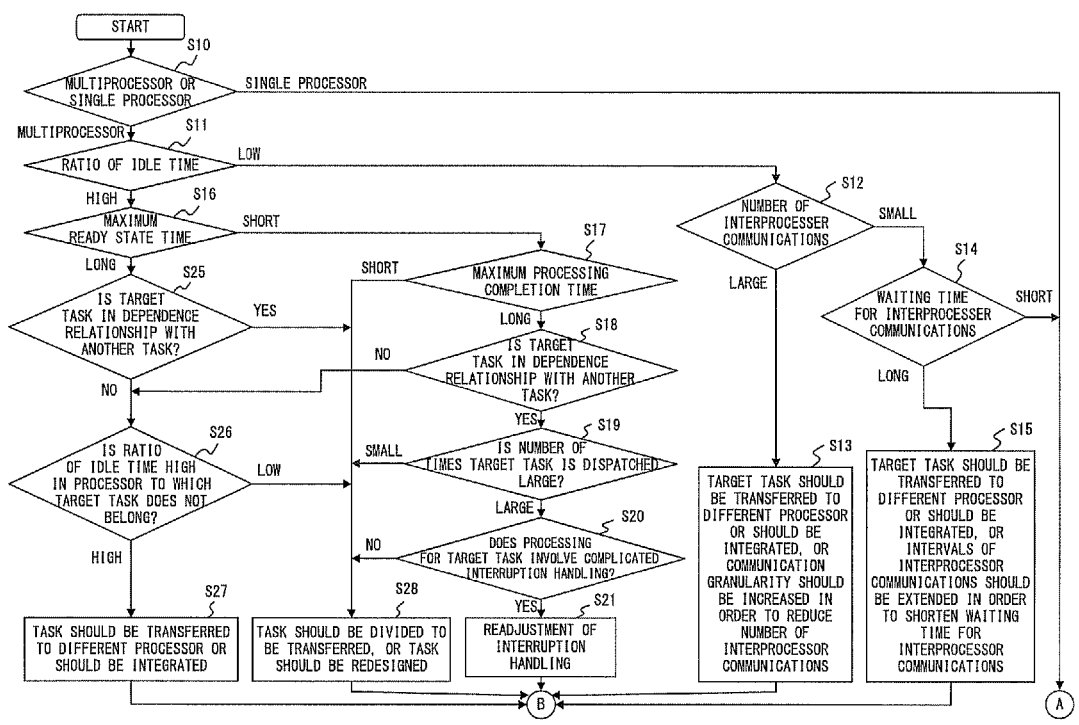
FIG. 14 is a detailed flowchart of a system optimization supporting process according to the first embodiment.
Figure 15:
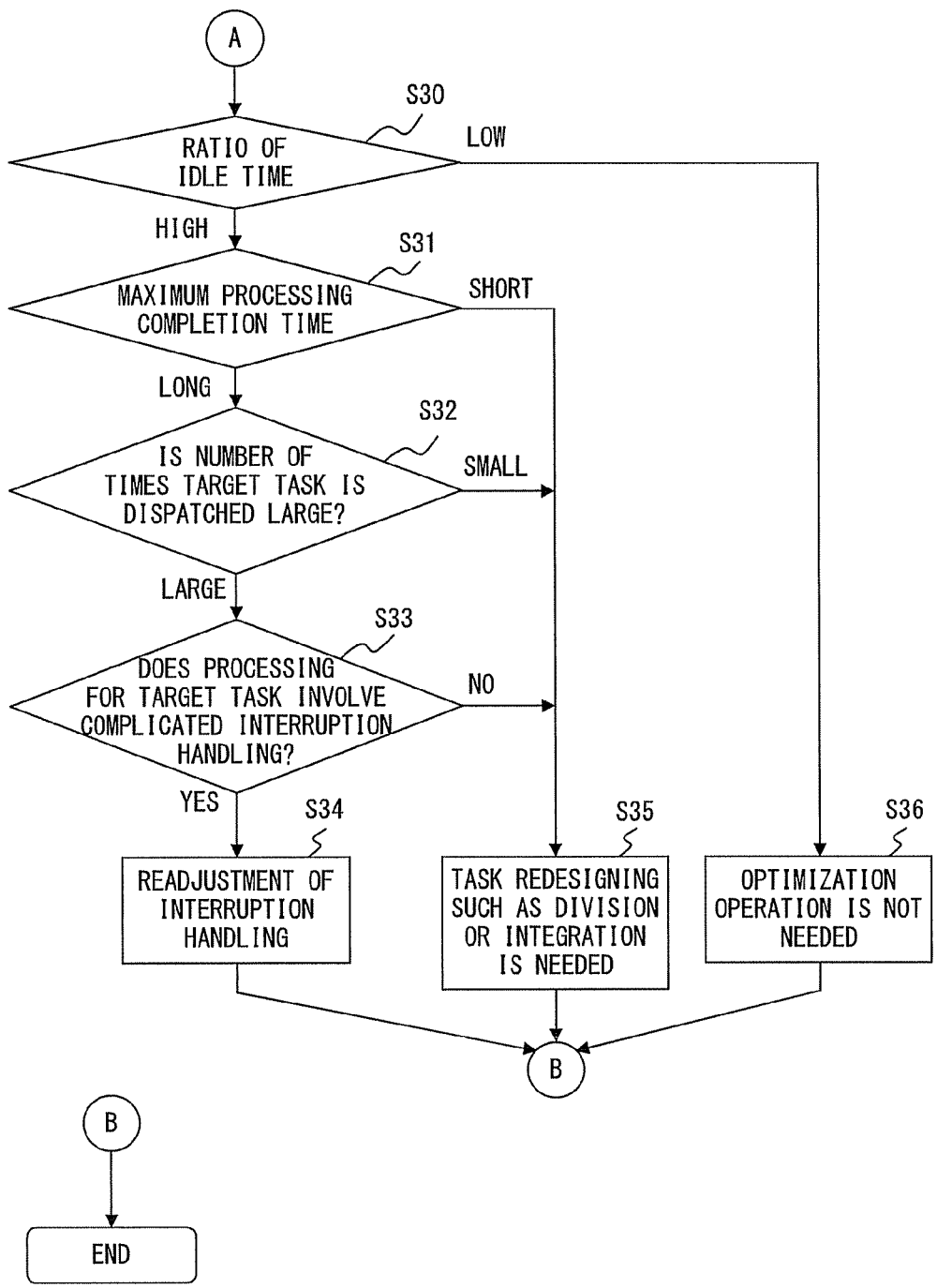
FIG. 15 is a remaining part of the detailed flowchart of a system optimization supporting process according to the first embodiment.

FIGS. 14 and 15 are detailed flowcharts of a system optimization supporting process in the first embodiment. When the process is activated in FIG. 14, it is determined in step S10 whether the system, such as an embedded system, is a multiprocessor system or a single processor system. Here, the case of a multiprocessor system is explained. In step S11, it is determined whether the ratio of the idle time of the entire system is high or low. When the ratio is low, it is determined in step S12 whether or not the number of interprocessor communications is large or small. When the number is large, it is output in step S13 that a task belonging to a processor should be transferred to a different processer or should be integrated, or the communication granularity, i.e., the communication amount of one communication should be increased as a method of optimizing the system. Thereafter, the process is terminated as illustrated in FIG. 15.

When the number of interprocessor communications is determined to be small in step 12, it is determined in step S14 whether the waiting time for the interprocessor communications is long or short. When the time is long, a method is output in which the task is transferred to a different processor or is integrated, or the intervals of the interprocessor communications are extended, and the process is terminated. A specific example of the extension of the intervals of the interprocessor communications is to give higher priority to task 3, which is irrelevant to task 2, when task 1 is communicating and task 2 is in a waiting state so that the time in which task 2 must wait for communications can be reduced.

When it is determined in step S11 that the ratio of the idle time of the entire system is high, it is determined in step S16 whether the maximum ready state time is long or short. The processes in and after step S16 are essentially executed in units of tasks. This determination as to the maximum ready state time as well is performed for each task.

When the maximum ready state time is short, it is determined in step S17 whether the maximum processing completion time of the task is long or short, and when it is long, it is determined in step S18 whether the task that is the current target is in a dependence relation with another task. When the target task is in a dependent relationship, it is determined in step S19 whether or not the number of times dispatching occurs between the target task and another task is large. When the number is large, it is determined in step S20 whether the processing for the target task involves complicated interruption handling, and when the target task involves complicated interruption handling, a readjustment of interruption handling is output as an optimization method in step S21, and the process is terminated.

If the maximum processing completion time of the target task is short in step S17, if the number of times the target task is dispatched is small in step S19, or if the target task does not involve complicated interruption handling in step S20, a redesign of the task such as the division or the integration of the task is output as an optimization method in step S28, and the process is terminated. For example, when the maximum processing completion time of a task is short, that task is determined to be of a small scale, and the integration of that task is considered effective.

When a maximum ready state time is determined in step S16 to be long, it is determined in step S25 whether or not the target task is in a dependence relationship with another task, and when the target task is in a dependence relationship, the process in step S28 is executed, and the process is terminated. When there is not such a dependence relationship, division of that task is possible.

When the target task is determined in step S25 to not be in a dependence relationship with another task, it is determined in step S26 whether or not the ratio of the idle time is high in a processor to which the target task does not belong, and when the ratio is low, the process in step S28 is executed, and the process is terminated.

When the ratio of the idle time is high, the transfer of the task to a different processer or the integration of the task is output as an optimization method in step S27, and the process is terminated. When the ratio of the idle time to a different processor is high, the task may naturally be transferred to that processor, whereas when the ratio is low, such transfer is impossible, and the method in step S28 is output.

When the system is determined in step S10 to be a single processor system or when the waiting time for the interprocessor communications is determined in step S14 to be short, the processes in and after step S30 illustrated in FIG. 15 are executed. In the subsequent steps, processes are executed in units of processors even in a multiprocessor system.

First, it is determined in step S30 whether the ratio of the idle time is high or low, and when it is low, it is output in step S36 that an optimization operation is not necessary for that processor, and the process is terminated. When the ratio of the idle time is high, processes similar to those in steps S17, S19 through S21, and S28 in FIG. 14 are executed in steps S31 through 35. Thereafter, the fact that a readjustment of interruption handling is needed is output as a system optimization method in step S34, and the fact that redesign of the task such as division, integration, etc. is needed is output as a system optimization method in step S35, and the process is terminated.

FIG. 16 illustrates in detail an example of performance factors according to the first embodiment. The performance factors are partially identical to those in FIG. 8. However, for an entire system with an ID of zero, the execution time of an idle routine, which indicates that none of the tasks with IDs 1 through 5 is running, is displayed and the difference from the execution time as the processing time of the operating system indicates the time during which the operating system is not running. A maximum ready state time, a maximum processing completion time, the number of interprocessor communications, a waiting time for interprocessor communications, and an interprocessor communication time (integrated), which is described on the bottom of this table, are similar to those explained above. The number of times dispatching occurs represents the number of times dispatching is conducted among tasks between time points Ts and Te. The number of interruptions represents the number of interruptions between time points Ts and Te.

The five performance factors starting from a ready state time through a time in which no task has been generated are not used in the processing flowcharts illustrated in FIGS. 14 and 15, and thus they will be explained by using the state transition diagram of tasks illustrated in FIG. 17. In FIG. 17, a task is repeatedly dispatched and preempted to be in an execution state (running state) and an executable sate (ready state).

A task can be halted to be in three types of states, a waiting state, a suspended state, and a waiting-suspended state. A waiting state is a state in which the execution of a task is halted with an instruction to wait given from, for example, the operating system. A suspended sate is a state in which a task has received an instruction to forcibly halt the execution of the task from, for example, another task. A waiting-suspended state is a state in which a waiting state and a suspended state coincide.

A task can be in other states, i.e., a dominant state in which a task has not been activated or has not been processed, and a nonexistent state in which a task has not been generated or has already been deleted.

Next, the second embodiment will be explained. FIG. 18 is a block diagram illustrating fundamental functions of a system optimization supporting method according to the second embodiment. FIG. 18 is different from FIG. 2 of the first embodiment in that the processes in steps S42, S43, or S44 in the second embodiment are executed as steps corresponding to step S2 in FIG. 2, while the processes in steps S41, S45, and S46 are similar to steps S1, S3, and S4 in FIG. 2.

In step S42, the value of the performance factors is obtained as a result of analyzing the trace information and the performance information, similarly to step S2. In step S43, a graph representing the value of the performance factors is generated, and in step S44, a chart representing the performance factors as a result of the analysis is generated. In step S45, an optimization method corresponding to the value of the performance factors, the generated graph, or the chart is output. In the second embodiment, it is also possible to statistically analyze the trace information and the performance information, generate a graph representing the result of the analysis, and output an optimization method on the basis of the generated graph.

Figure 20:
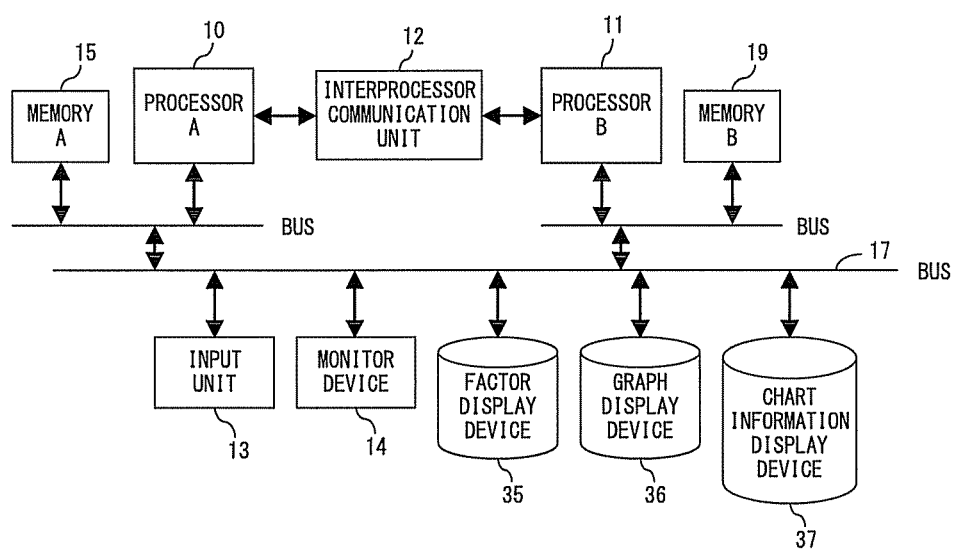
FIG. 20 illustrates the second example of a multiprocessor system according to the second embodiment.

FIGS. 19 and 20 illustrate examples of the configurations of a multiprocessor system according to the second embodiment. FIGS. 19 and 20 include a factor display device 35, a graph display device 36, and a chart information display device 37 as devices corresponding to the optimization supporting apparatus 16 in FIGS. 3 and 4.

Figure 21:
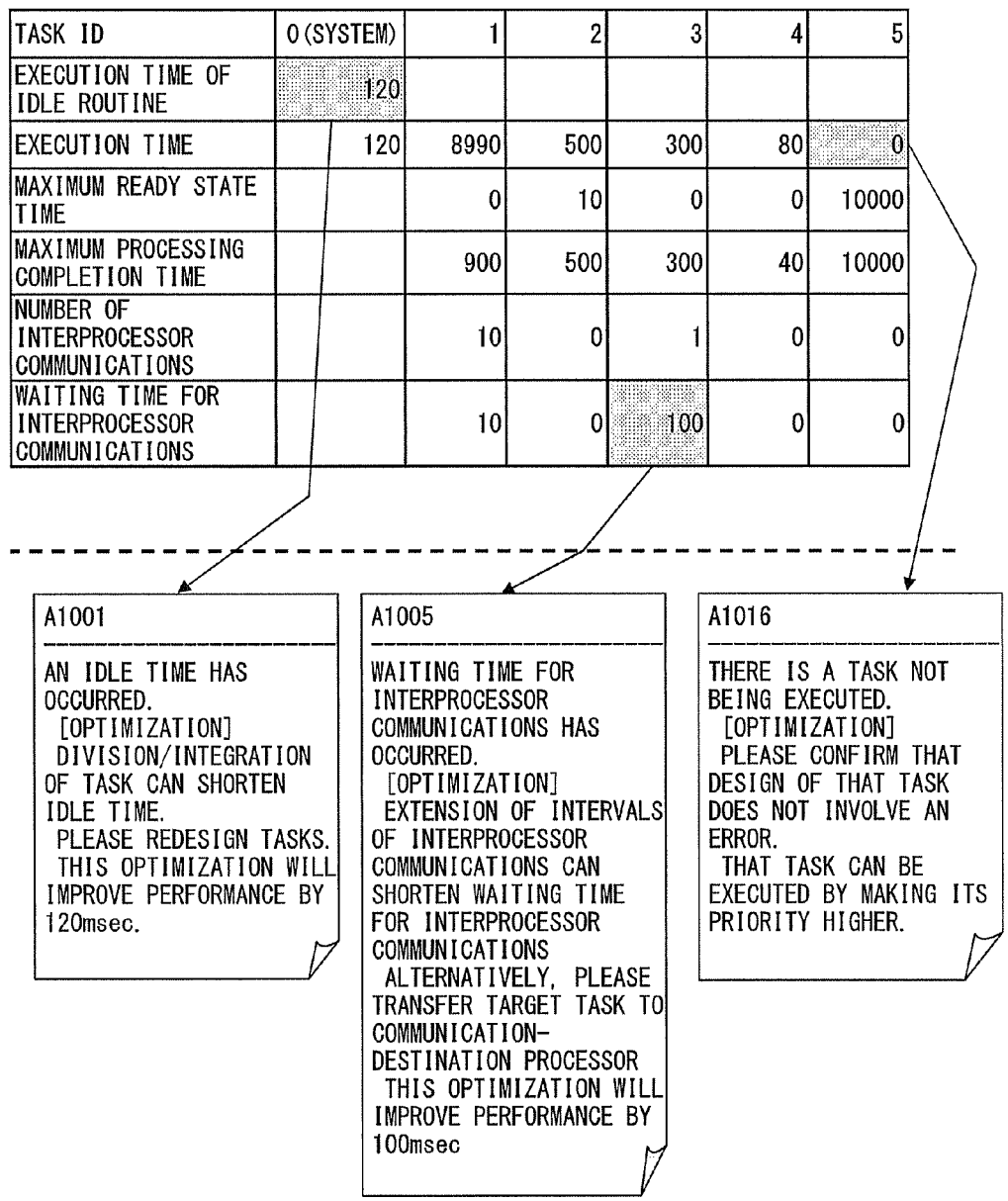
FIG. 21 illustrates examples of performance factors and optimization methods according to the second embodiment.

FIG. 21 illustrates examples of performance factors and optimization methods according to the second embodiment. It is illustrated that the execution time of the idle routine, in which none of tasks 1 through 5 is being executed, is 120 ms, and a redesign of tasks such as division or integration is displayed as an optimization method for that performance factor. Also, an optimization method in which the intervals of interprocessor communications are extended or transferring of the target task to the communication destination processer is output as an optimization for the performance factor indicating that the waiting time for interprocessor communications for task 3 is 100 ms. Further, the confirmation of the design of the task or raising the priority of the task is displayed as an optimization method for the performance factor indicating that the execution time of task 5 is zero.

Figure 22:
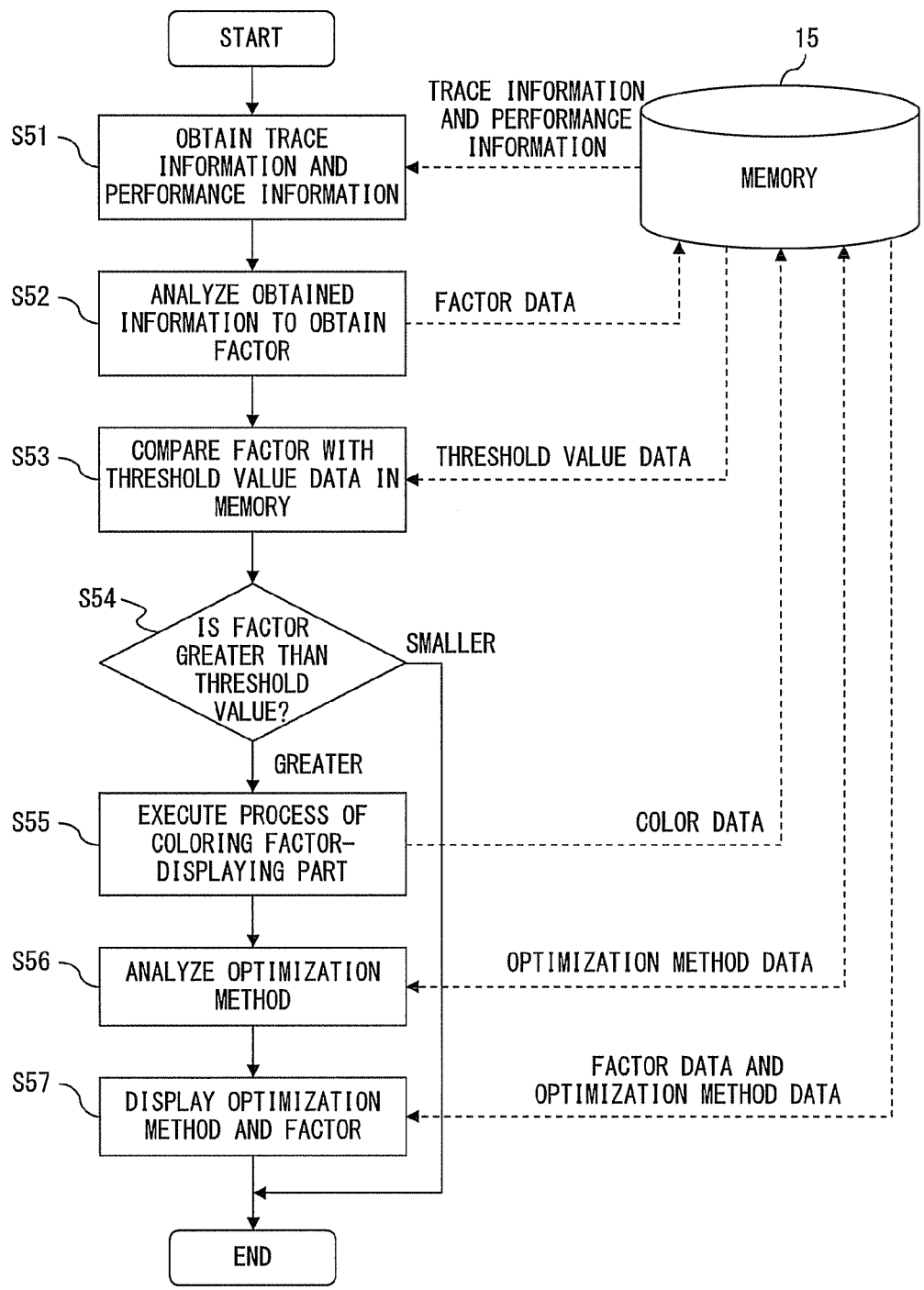
FIG. 22 is a flowchart for a process of displaying performance factors and optimization methods.

FIG. 22 is a detailed flowchart for a process of displaying the performance factors and the optimization methods illustrated as examples in FIG. 21. When the process is activated in FIG. 22, trace information and performance information are obtained from, for example, memory 15 in step S51, the obtained information is analyzed so as to obtain the performance factor in step S52, and the factor data is stored in the memory 15. Thereafter, the value of the performance factor is compared with the threshold value data stored in the memory 15 in step S53. The threshold value data is, for example, data that the user stores in the memory 15 beforehand, and when, for example, data indicating that the threshold value for the execution time of an idle routine is 50 ms is stored, it is determined that the execution time of the idle routine is greater than the threshold value corresponding to the display state in FIG. 21. As threshold value data, a default value to be used when, for example, the user has set an inappropriate value is stored as well.

This comparison is conducted in step S54, and when the performance factor is smaller than the threshold value, the process is terminated immediately. When the performance factor is greater than the threshold value, a process of coloring the part displaying the threshold value, such as the execution time of the idle routine, by using color data stored in the memory 15 is executed in step S55. In step S56, an optimization method corresponding to the fact that the execution time of the idle routine is greater than the threshold value is analyzed in step S56. In step S57, the data of the performance factor and the optimization method are used to display the optimization method corresponding to the performance factor, and the process is terminated. The data related to the method of optimizing the system in claim 16 is equivalent to the threshold value data stored in, for example, the memory 15.

Figure 23:
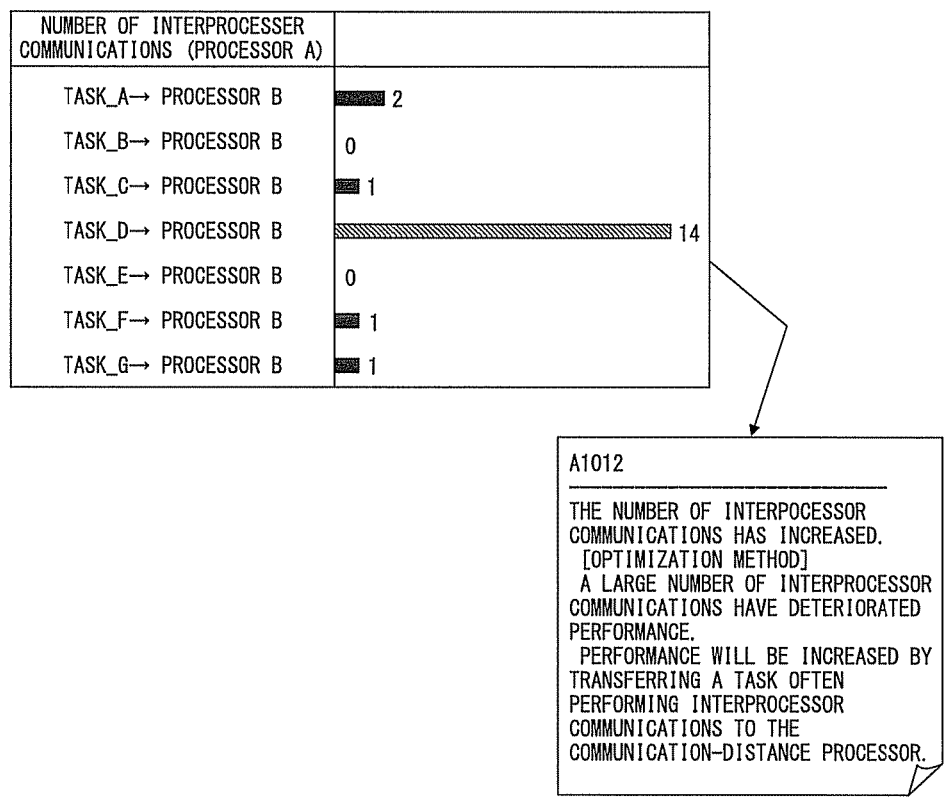
FIG. 23 illustrates an example of a graph and an optimization method according to the second embodiment.

FIG. 23 illustrates an example of a graph and an optimization method according to the second embodiment. In FIG. 23, the number of times that each of tasks A through G belonging to processor A performed interprocessor communications to a different processor such as processor B in FIG. 19 are displayed in the form of graph.

It is also displayed that the number of communications between task D and processor B is large, and an optimization method in which task D is transferred to the communication destination processor so as to improve the performance is displayed.

Figure 24:
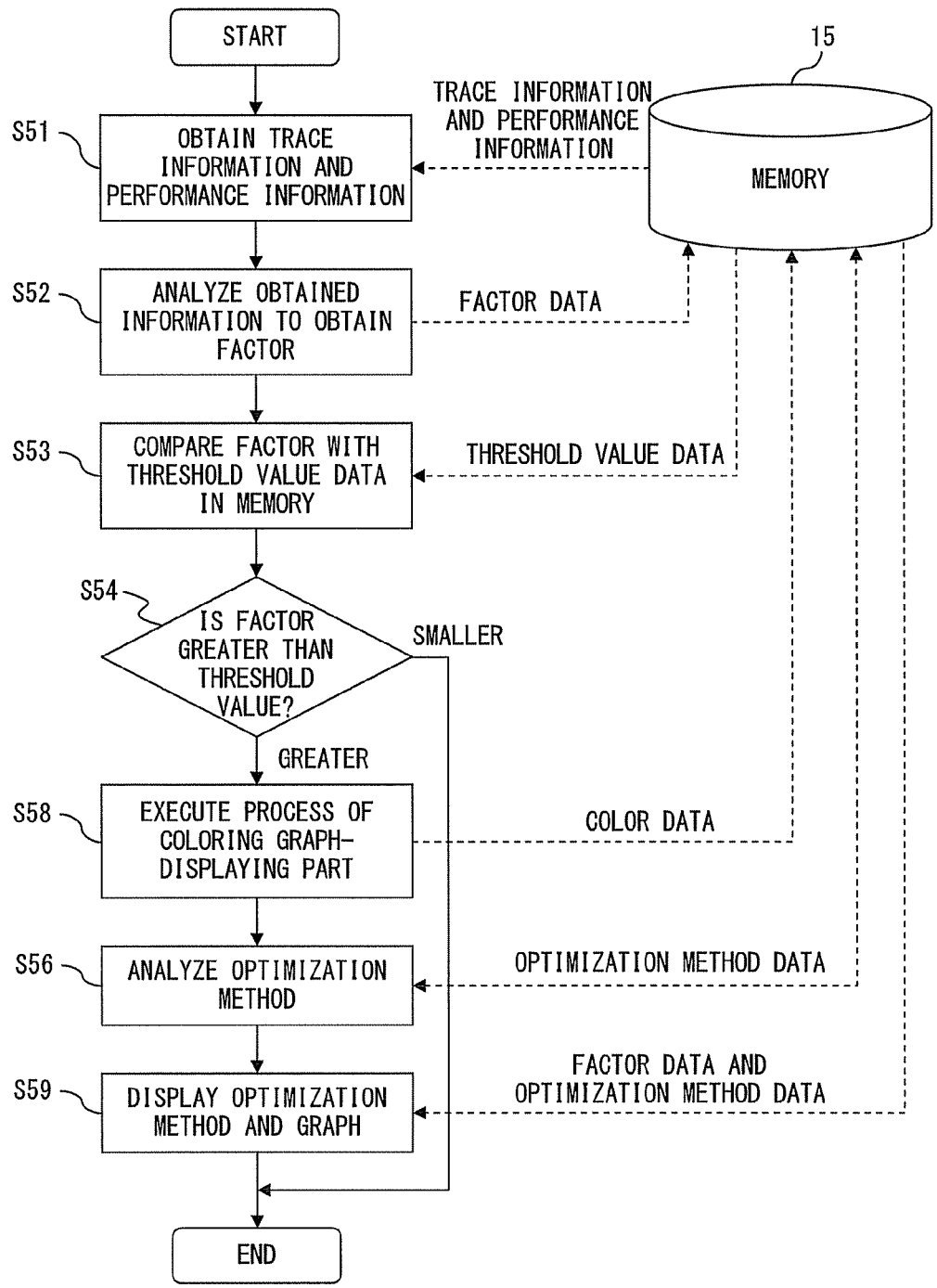
FIG. 24 is a flowchart for a process of displaying a graph and an optimization method.

FIG. 24 is a detailed flowchart for a process of displaying a graph and an optimization method corresponding to the example in FIG. 23. The processes in FIG. 24 are almost identical to those in FIG. 22, and are different only in that a process of coloring the graph-displaying part is executed in step S58 instead of executing a process of coloring the factor-displaying part in step S55 in FIG. 22, and that an optimization method and a graph are displayed in step S59 instead of displaying an optimization method and a performance factor in step S57.

Figure 25:
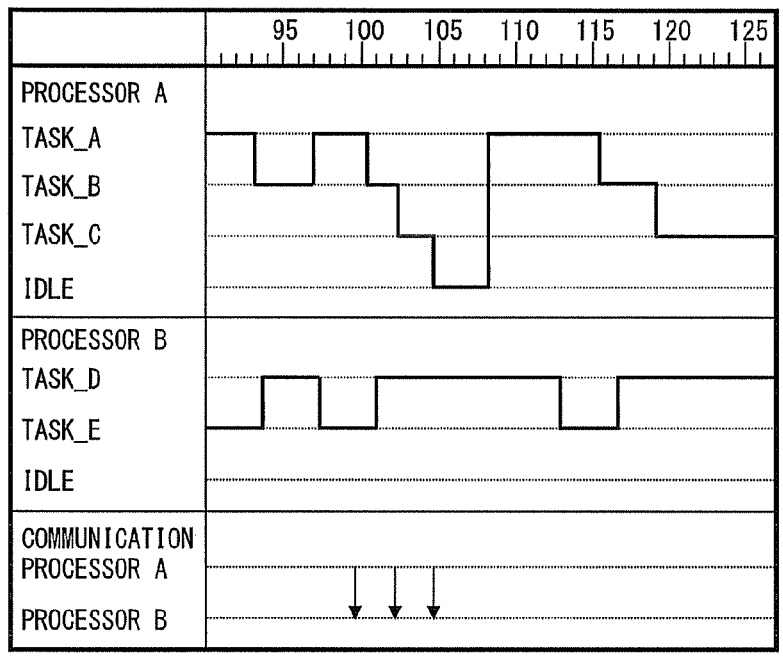
FIG. 25 illustrates an example of displaying a time chart and an optimization method according to the second embodiment.

FIG. 25 illustrates an example of displaying a time chart and an optimization method according to the second embodiment. FIG. 25 illustrates that interprocessor communications are performed at the time point of around 100 ms, when dispatch from task A to task B is conducted, at a time point when dispatch from task B to task C is conducted, and at a time point when dispatch from task C to the idle state is conducted on the sides of processors A and B in association with the task transition diagram illustrating the transition states of a task.

Also, an optimization method in which the intervals of the communications are extended or the task is transferred to the communication destination processor when that task is not in a dependent relationship with other tasks is displayed in response to the fact that the interprocessor communications are concentrated around 100 ms.

FIG. 26 illustrates a chart corresponding to the example in FIG. 25 and according to the second embodiment, and also illustrates a detailed flowchart for an optimization method. The processes in FIG. 26 are identical to those in, for example, FIG. 22, but are different only in that a process of coloring the chart-displaying part is executed in step S61 and the optimization method and the charts are displayed in step S62.

In the second embodiment, the configurations of the display devices such as the factor display device 35, the graph display device 36, and the chart information display device 37 in FIG. 19 are the same as those of the optimization supporting apparatus 16 according to the first embodiment in FIG. 5, and are also the same as FIG. 6 in the procedures for obtaining trace information and performance information, and the explanations thereof are omitted.

Also, the examples of trace information and performance information are the same as those in FIGS. 7 and 8, the performance factors being used are the same as those in the explanations based on FIGS. 9 through 13, and the examples of performance factor data are the same as those in FIG. 16, and therefore the explanations thereof are omitted.

Figure 27:
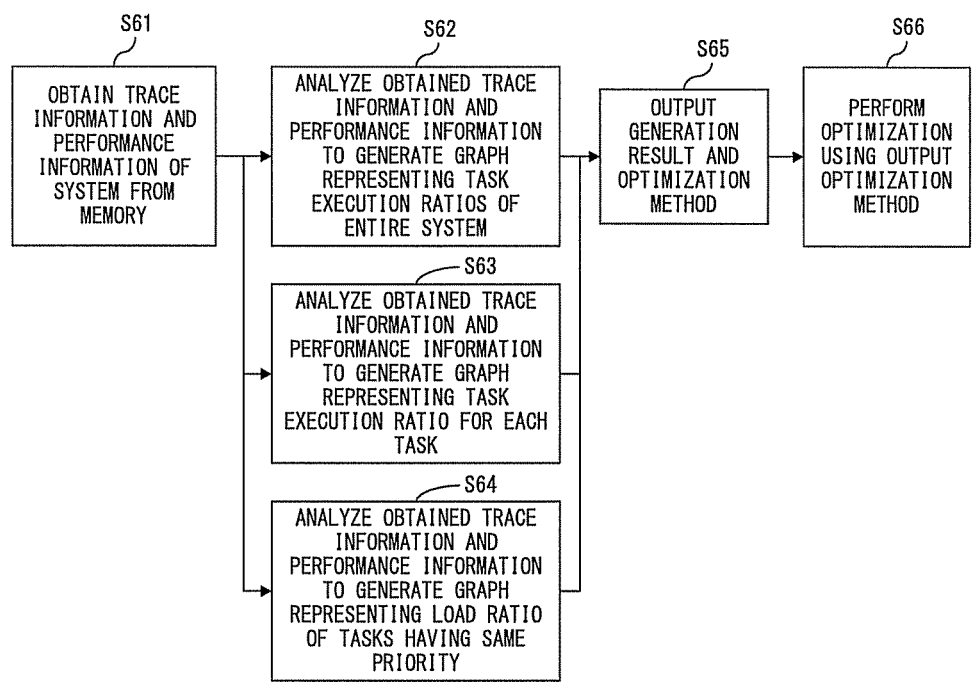
FIG. 27 is a block diagram illustrating fundamental functions in an optimization supporting method according to the third embodiment.

FIG. 27 is a block diagram illustrating fundamental functions in an optimization supporting method according to the third embodiment. In FIG. 27, the processes in steps S62, S63, or S64 are executed after the process of step S61 while the processes in steps S61 and S66 are the same as those in steps S1 and S4 in FIG. 2. In step S62, a graph representing the task execution ratios of the entire system is generated on the basis of the obtained trace information and the performance information. In step S65, an optimization method is output together with that graph, and the system is optimized in step S66.

Alternatively, after the process in step S61, a graph representing the task execution ratios for each task is generated on the basis of the trace information and the performance information obtained in step S63, an optimization method is output together with the graph in step S65, and the system is optimized in step S66.

Alternatively, after the process in step S61, a graph representing the load ratios of the tasks having the same priority is generated on the basis of the trace information and the performance information obtained in step S64, and an optimization method is output together with that graph in step S65, and the system is optimized in step S66.

FIG. 28 illustrates an example of a graph representing the task execution ratios of the entire system and the optimization method displayed together with the graph according to the third embodiment. Task execution ratio in the entire system used herein represents the ratio of the execution state time of each task to the system time (for example, the difference between the value of Te–Ts and the processing time of the OS) in the case of a single processor system. In the case of a multiprocessor system, it represents the ratio of the executed time of each task to the task executable time of the entire system including plural processors. In FIG. 28, the sum of the execution state times of the respective tasks is 90 percent, and it is illustrated that the system can be optimized within the remaining 10 percent.

Figure 29:
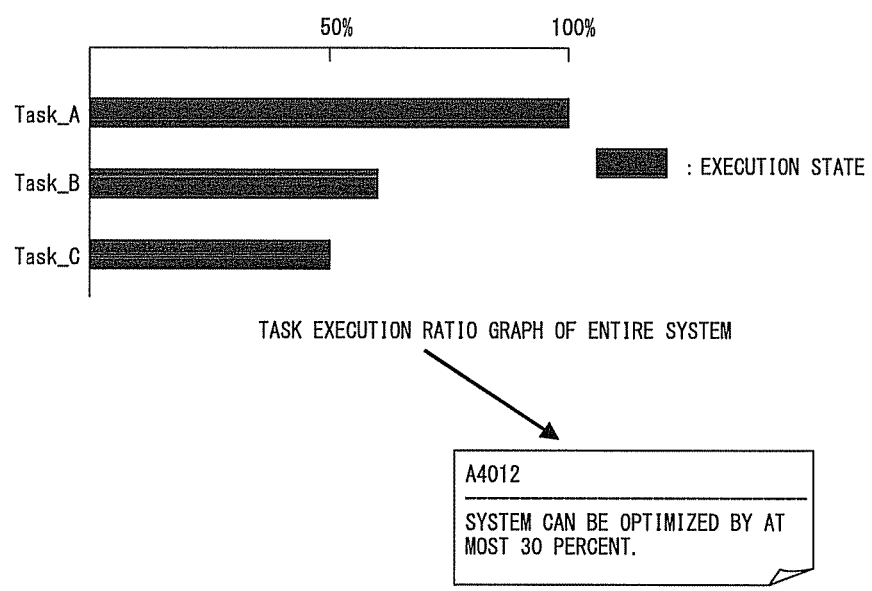
FIG. 29 illustrates the second example of a graph and an optimization method according to the third embodiment.

FIG. 29 illustrates an example of a graph representing the task execution ratio for each task generated in step S63 in FIG. 27, and the optimization method. The task execution ratio of each task represents the ratio between the sum of the execution times of a task and the sum of the sum of the processing completion times (survival times), and the degree of optimization that can be executed is determined by calculating the average of the execution ratios of the tasks, and the results are displayed. In this example, the execution ratios of tasks A through C are 100 percent, 60 percent, and 50 percent, respectively, with an average of 70 percent. Thus, the fact that optimization of at most 30 percent can be performed is displayed as an optimization method.

Figure 30:
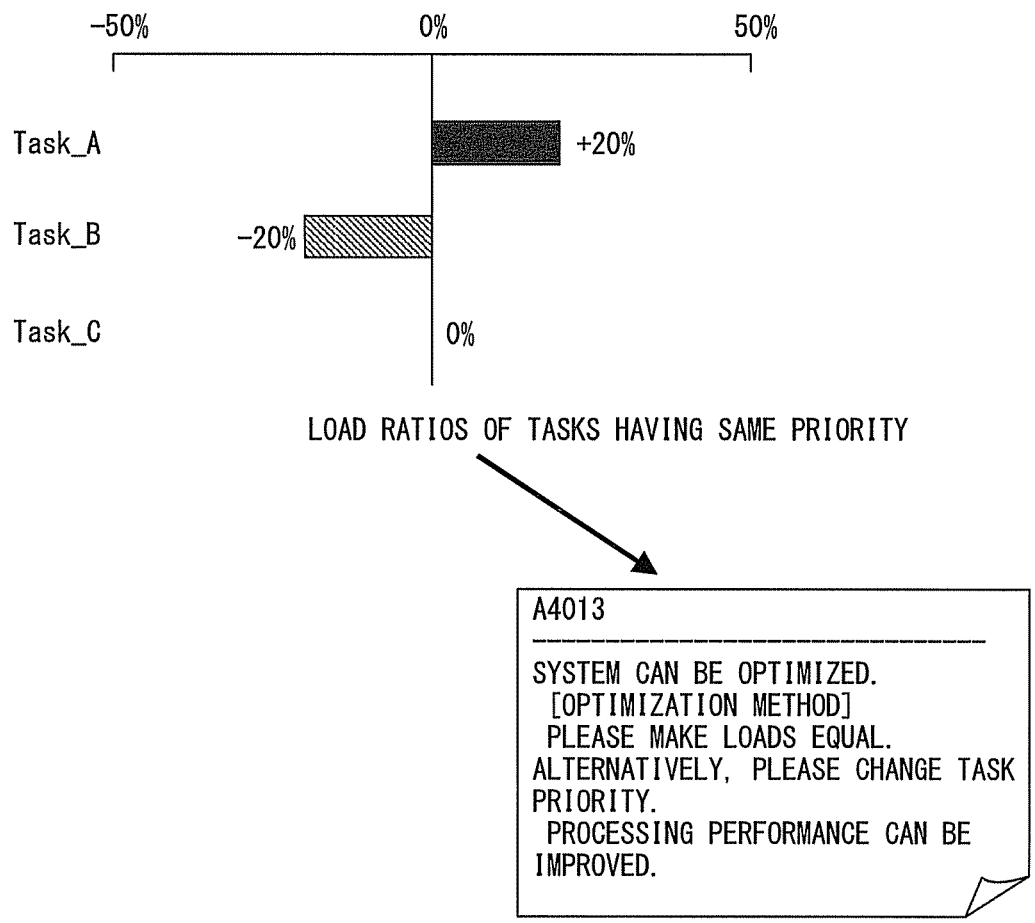
FIG. 30 illustrates the third example of a graph and an optimization method.

FIG. 30 illustrates an example of a graph representing the load ratios of the tasks having the same priority generated in step S64 in FIG. 27 and illustrates the optimization method. In FIG. 30, load ratios, which are how much the execution ratios of respective tasks are higher or lower than the average value "1" of the tasks in the entire system on the assumption that three tasks A through B have the same priority, are displayed. In FIG. 30, an optimization method in which the loads are made to be equal or the priority given to the tasks is rearranged in accordance with the displayed load ratios is also displayed.

FIG. 31 is a detailed flowchart for processes of displaying a graph and an optimization method according to the third embodiment. In FIG. 31, when the process is activated, trace information and performance information are obtained from the memory 15 in step S71, and the task execution ratio for each task is obtained as a performance factor after analyzing the obtained information in step S72. Thereafter, the data of the performance factor is analyzed in step S73, and it is determined in step S74 whether an optimization is possible or impossible. When an optimization is impossible, the process is terminated immediately.

When, for example, all the task execution ratios in FIG. 29 are 100 percent, an optimization is impossible, and the process is terminated. However, when the average value is 70 percent as explained in FIG. 29, an optimization is possible, and thus data of optimization methods is obtained from the memory 15 in step S75 so as to analyze optimization methods, and a graph and an optimization method are displayed in step S76 so as to terminate the process.

FIG. 32 illustrates an example of performance factor data according to the third embodiment. In FIG. 32, the execution time of the entire system includes not only the execution times of tasks 1 through 3 but also the processing time of the operating system, and other such information. The load ratio of priority [1] is obtained from the values of the task execution ratios (system) of the tasks with IDs 1 and 2. The load ratio of priority [3] is "1" because only task 3 has this priority.

Also in the third embodiment, the configuration of the processor system and the method of obtaining trace information and performance information are as described above, and the explanations thereof are omitted.

FIG. 33 is a block diagram illustrating fundamental functions of an optimization supporting method according to the fourth embodiment. This function block diagram is similar to FIG. 27 for the third embodiment. However, FIG. 33 is different from FIG. 27 in that a graph representing the executable states of tasks is generated in step S82 while a task execution ratio graph of the entire system, a task execution ratio graph for each task, and a load ratio graph of tasks with the same priority are generated in steps 62, 63, or 64 in the third embodiment.

FIG. 34 illustrates an example of a graph representing executable states of tasks generated in step S82 in FIG. 33. In FIG. 34, the number of tasks in an executable state (ready state) in the entire system is displayed at certain time intervals.

FIG. 35 illustrates an example of displaying a graph of executable states and an optimization method. In FIG. 35, a time during which a task was in an executable state or the number of times that a task was in such a state is displayed for each of tasks A through D, and the fact that a redesign of tasks such as division or integration of a task should be performed is displayed as an optimization method in order to shorten an executable state of a task that is in an executable state for a long time. In this redesign of a task, task 2 is integrated into task 3 belonging to a different processor when task 2 cannot be transferred due to a low priority of task 2, meaning that task 2 is not important, and a high priority to task 1, meaning that task 1 is important.

Also in the fourth embodiment, the configuration of the processor system, the configuration of the optimization apparatus, the method of obtaining trace information and performance information, examples of data such as trace information, etc., and the flowcharts for the optimization supporting method are similar to those in, for example, the first embodiment, and the explanations thereof are omitted.

Figure 36:
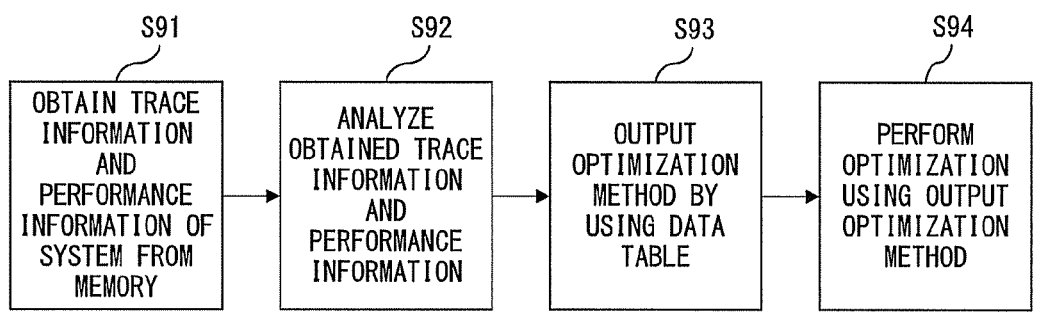
FIG. 36 is a block diagram illustrating fundamental functions of an optimization supporting method according to the fifth embodiment.

As the last embodiment, the fifth embodiment will be explained. FIG. 36 is a block diagram illustrating fundamental functions of an optimization supporting method according to the fifth embodiment. This fifth embodiment is different from the first through fourth embodiments in that the optimization of the system is supported by studying the system calls used by tasks instead of optimizing the system through, for example, the redesigning of tasks or the like. Also in the block diagram illustrating fundamental functions, this embodiment is different from the other embodiments in that an optimization method is output in step S93 by using, for example, a data table indicating, for example, similar system calls in the group of system calls.

Figure 38:
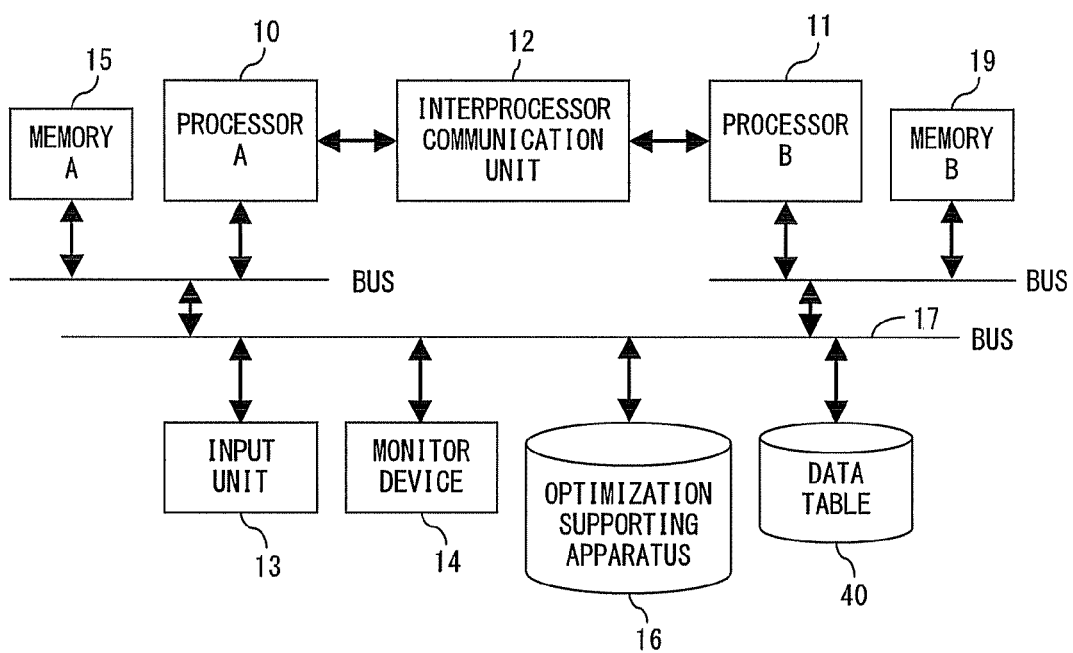
FIG. 38 is a block diagram illustrating the second example of the system configurations according to the fifth embodiment.

FIGS. 37 and 38 are block diagrams illustrating examples of the system configurations according to the fifth embodiment. FIGS. 37 and 38 are different from FIGS. 3 and 4 of the first embodiment in that a data table 40 is added for storing data used for determining the similarity between system calls.

Figure 39:
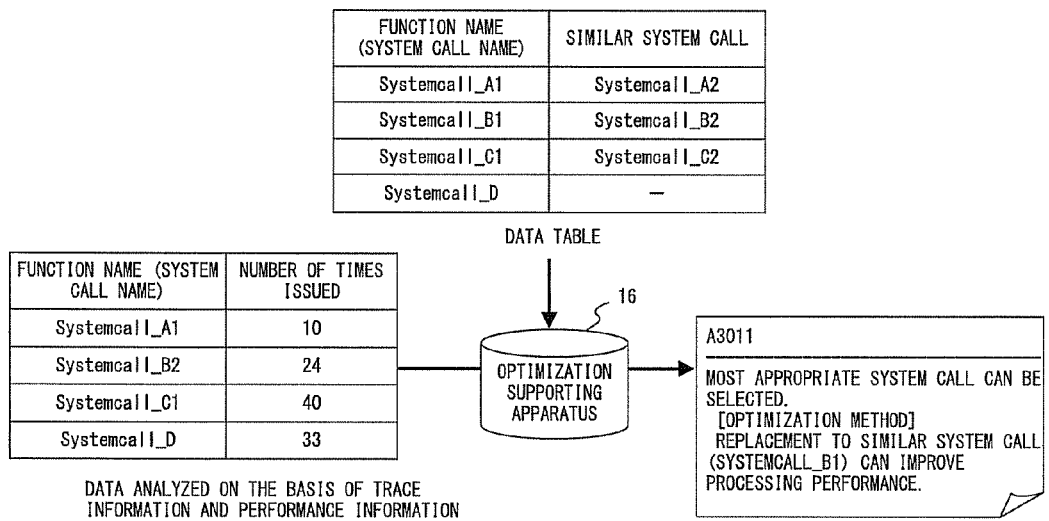
FIG. 39 illustrates an example of displaying content stored in a data table and an optimization method according to the fifth embodiment.

FIG. 39 illustrates an example of displaying an optimization method using the storage content on the data table. On the data table 40 in FIGS. 37 and 38, names of system calls similar to other system calls, corresponding to the names of functions, are stored. For example, it is illustrated that system call A2 is similar to system call A1.

The number of times that each system call has been issued is given to the optimization supporting apparatus 16 as analysis data based on the trace information and the performance information. System call B2 is similar to system call B1; however, system call B1 requires a shorter processing time. Accordingly, an optimization method is outputted in which system call B2, which is issued a relatively large number of times, is replaced with similar system call B1.

FIG. 40 is a detailed flowchart for an optimization supporting process according to the fifth embodiment. When the process is activated in FIG. 40, trace information and performance information are obtained from the memory 15 in step S101, the information is analyzed in step S102, the information is compared with data on the data table in step S103, and it is determined in step S104 whether or not there is a similar system call that is appropriate. When there is not such a system call, the process is terminated immediately.

When there is a similar system call that is appropriate, e.g., when there is a similar system call that requires a shorter processing time, a process of, for example, coloring the data-displaying part, displaying the number of times that system call is called, is executed in step S105, an optimization method is analyzed using the data read from the memory 15 in step S106, an optimization method in which, for example, those system calls are exchanged is displayed in step S107, and the process is terminated.

Also in the fifth embodiment, the configuration of the optimization supporting apparatus, the method of obtaining trace information and performance information, examples of data such as trace information, and the like are similar to those in, for example, the first embodiment, and the explanations thereof are omitted.

What is claimed is:
1. An apparatus comprising:
a first processor;
a second processor configured to execute a plurality of tasks with the first processor, wherein at least one task of the plurality of tasks waits for a termination of a communication between a current task and the first processor prior to communication with the first processor; and an information analysis unit configured to analyze trace information associated with the first and second processors to obtain a performance factor, wherein the performance factor comprises a value of a sum of time periods during which each of the plurality of tasks waits prior to communication with the first processor.

2. The apparatus of claim 1, further comprising:
an information obtainment unit configured to read, from memory, the trace information and performance information associated with the trace information; and
an optimization method output unit configured to output a method of optimizing the communication between the first and second processors based on the performance factor.

3. The apparatus of claim 2, wherein the optimization method output unit is configured to output a time chart based on the performance factor, a performance graph based on the performance factor, or a combination thereof.

4. The apparatus of claim 2, wherein the optimization method output unit is configured to read, from the memory, data from an external environment, wherein the method of optimizing the communication between the first and second processors is based on the data.

5. The apparatus of claim 1, wherein the performance factor further comprises:
an idle time associated with the each of the plurality of tasks,
a maximum value of a ready time associated with a wait state of each of the plurality of tasks,
a maximum processing completion time of each of the plurality of tasks,
a number of communications between the first processor and the second processor associated with the plurality of tasks,
or a combination thereof.

6. The apparatus of claim 1, wherein the performance factor further comprises a task execution ratio indicative of a ratio of a time in which a task from the plurality of tasks is in an execution state to a time in which the plurality of tasks is in the execution state.

7. The apparatus of claim 1, wherein the performance factor further comprises an execution ratio indicative of a ratio of an actual process execution time of each of the plurality of tasks to a sum of execution waiting times and actual process execution times associated with the plurality of tasks.

8. The apparatus of claim 1, wherein the performance factor further comprises a load ratio indicative of a normalization of processing times associated with the plurality of tasks.

9. A method comprising:
executing a plurality of tasks with a first processor and a second processor;
waiting for a termination of a communication between a current task and the first processor prior to communication of at least one task of the plurality of tasks from the second processor to the first processor; and
analyzing trace information associated with the first and second processors to obtain a performance factor, wherein the performance factor comprises a value of a sum of time periods during which each of the plurality of tasks waits prior to communication with the first processor.

10. The method of claim 9, further comprising:
reading, from memory, the trace information and performance information associated with the trace information; and
outputting a method of optimizing the communication between the first and second processors based on the performance factor.

11. The method of claim 9, wherein the analyzing further comprises obtaining the performance factor based on:
an idle time associated with the each of the plurality of tasks,
a maximum value of a ready time associated with a wait state of each of the plurality of tasks,
a maximum processing completion time of each of the plurality of tasks,
a number of communications between the first processor and the second processor associated with the plurality of tasks,
or a combination thereof.

12. The method of claim 9, wherein the analyzing further comprises obtaining the performance factor based on a task execution ratio indicative of a ratio of a time in which a task from the plurality of tasks is in an execution state to a time in which the plurality of tasks is in the execution state.

13. The method of claim 9, wherein the analyzing further comprises obtaining the performance factor based on a load ratio indicative of a normalization of processing times associated with the plurality of tasks.

14. A system comprising:
a first processor;
a bus;
a second processor configured to execute a plurality of tasks with the first processor, wherein at least one task of the plurality of tasks waits for a termination of a communication between a current task and the first processor, over the bus, prior to communication with the first processor; and
an information analysis unit configured to analyze trace information associated with the first and second processors to obtain a performance factor, wherein the performance factor comprises a value of a sum of time periods during which each of the plurality of tasks waits prior to communication with the first processor.

15. The system of claim 14, further comprising:
an information obtainment unit configured to read, from memory, the trace information and performance information associated with the trace information; and
an optimization method output unit configured to output a method of optimizing the communication between the first and second processors based on the performance factor.

16. The system of claim 15, wherein the performance factor further comprises:
an idle time associated with the each of the plurality of tasks,
a maximum value of a ready time associated with a wait state of each of the plurality of tasks,
a maximum processing completion time of each of the plurality of tasks,
a number of communications between the first processor and the second processor associated with the plurality of tasks,
or a combination thereof.

17. The system of claim 15, wherein the performance factor further comprises a task execution ratio indicative of a ratio of a time in which a task from the plurality of tasks is in an execution state to a time in which the plurality of tasks is in the execution state.

18. The system of claim 15, wherein the performance factor further comprises an execution ratio indicative of a ratio of an actual process execution time of each of the plurality of tasks to a sum of execution waiting times and actual process execution times associated with the plurality of tasks.

19. The system of claim 15, wherein the performance factor further comprises a load ratio indicative of a normalization of processing times associated with the plurality of tasks.

20. The system of claim 15, wherein the first processor, bus, second processor, and information analysis unit are in an embedded system.

* * * * *